United States Patent
Shiroki et al.

(10) Patent No.: US 11,056,775 B2
(45) Date of Patent: Jul. 6, 2021

(54) INTEGRATED ANTENNA MODULE AND IN-VEHICLE SYSTEM

(71) Applicant: Yazaki Corporation, Tokyo (JP)

(72) Inventors: Takashi Shiroki, Shizuoka (JP); You Yanagida, Shizuoka (JP); Kunihiko Yamada, Shizuoka (JP); Ryoma Toyoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/282,267

(22) Filed: Feb. 21, 2019

(65) Prior Publication Data

US 2019/0267702 A1    Aug. 29, 2019

(30) Foreign Application Priority Data

Feb. 26, 2018    (JP) ............................. JP2018-031801

(51) Int. Cl.
*H01Q 1/32* (2006.01)
*H01Q 1/22* (2006.01)
(Continued)

(52) U.S. Cl.
CPC ............... *H01Q 1/32* (2013.01); *H01Q 1/22* (2013.01); *H01Q 1/38* (2013.01); *H01Q 1/523* (2013.01); *H01Q 3/26* (2013.01); *H01Q 5/40* (2015.01); *H01Q 21/0031* (2013.01); *H01Q 21/28* (2013.01); *H01Q 23/00* (2013.01); *H04B 10/2575* (2013.01)

(58) Field of Classification Search
CPC .. H01Q 1/3275; H01Q 1/3283; H01Q 1/3291; H01Q 1/40; H01Q 9/0442; H01Q 21/065; H01Q 1/32; H01Q 1/22; H01Q 1/38; H01Q 1/523; H01Q 5/40; H01Q 3/26; H01Q 21/0031; H01Q 21/28; H01Q 23/00; H01Q 10/2575
See application file for complete search history.

(56) References Cited

U.S. PATENT DOCUMENTS 6,433,749 B1    8/2002    Thompson
7,280,810 B2 *  10/2007   Feher ................... H04M 3/382
                                                                 370/208
(Continued)

FOREIGN PATENT DOCUMENTS

EP        1 088 369 A1      4/2001
JP       2002-290148 A     10/2002
(Continued)

OTHER PUBLICATIONS

Hidekazu Taoka; "Tutorial on Implementation Techniques and Experiments for Multi-Antenna Transmission"; In Proceedings of the Mar. 2, 2010 IEICE General Conference of Japan, communication 1, SS-63, BT-1-2.

*Primary Examiner* — Jimmy T Vu
(74) *Attorney, Agent, or Firm* — Kenealy Vaidya LLP

(57) ABSTRACT

An integrated antenna module to be applied to an in-vehicle system includes an antenna element group that is mounted on a vehicle and is formed of a plurality of antenna elements, and the antenna element group constitutes a plurality of antennas capable of transmitting or receiving a plurality of electromagnetic waves by combining the plurality of antenna elements.

20 Claims, 15 Drawing Sheets

(51) Int. Cl.
*H01Q 21/00* (2006.01)
*H01Q 1/52* (2006.01)
*H01Q 5/40* (2015.01)
*H01Q 3/26* (2006.01)
*H01Q 1/38* (2006.01)
*H01Q 23/00* (2006.01)
*H01Q 21/28* (2006.01)
*H04B 10/2575* (2013.01)

(56) References Cited

U.S. PATENT DOCUMENTS

| | | | | |
|---|---|---|---|---|
| 8,811,369 | B2* | 8/2014 | Laroia | H04W 72/06 370/343 |
| 2002/0132600 | A1 | 9/2002 | Rudrapatna | |
| 2003/0058175 | A1* | 3/2003 | Akiyama | H01Q 9/0428 343/702 |
| 2003/0214447 | A1 | 11/2003 | Sasagawa et al. | |
| 2006/0035674 | A1 | 2/2006 | Karaoguz et al. | |
| 2007/0103377 | A1 | 5/2007 | Abramov et al. | |
| 2013/0027240 | A1* | 1/2013 | Chowdhury | G01S 13/584 342/94 |
| 2017/0187101 | A1* | 6/2017 | Freeman | H01Q 1/3291 |
| 2017/0317408 | A1 | 11/2017 | Hamada et al. | |
| 2020/0029270 | A1 | 1/2020 | Matsuda et al. | |

FOREIGN PATENT DOCUMENTS

| | | |
|---|---|---|
| JP | 2003-332817 A | 11/2003 |
| JP | 2005-521314 A | 7/2005 |
| JP | 2007-527125 A | 9/2007 |
| JP | 2009-171019 A | 7/2009 |
| JP | 2017-200086 A | 11/2017 |
| JP | 2018-26660 A | 2/2018 |
| WO | 2006/021235 A1 | 3/2006 |
| WO | 2016/185871 A1 | 11/2016 |

\* cited by examiner

INTEGRATED ANTENNA MODULE AND IN-VEHICLE SYSTEM

CROSS-REFERENCE TO RELATED APPLICATION(S)

The present application claims priority to and incorporates by reference the entire contents of Japanese Patent Application No. 2018-031801 filed in Japan on Feb. 26, 2018.

BACKGROUND OF THE INVENTION

1. Field of the Invention

The present invention relates to an integrated antenna module and an in-vehicle system.

2. Description of the Related Art

As a conventional antenna module mounted on a vehicle, for example, Japanese Patent Application Laid-open No. 2009-171019 discloses an over-head module mounted on a ceiling surface of a cabin. In this over-head module, an antenna for an in-vehicle radio device is housed, and a part or the whole of the antenna is arranged in a radio wave transmission/reception area.

Meanwhile, the over-head module described in the above Japanese Patent Application Laid-open No. 2009-171019 requires, for example, communication using more diverse electromagnetic waves in conformity with a recent trend of converting a car into a connected car. Even in this case, the over-head module is desired to ensure proper communication, and there is room for further improvement in this point.

SUMMARY OF THE INVENTION

The present invention has been made in view of the above circumstances, and an object of the present invention is to provide an integrated antenna module and an in-vehicle system capable of ensuring proper communication using diverse electromagnetic waves.

An integrated antenna module according to one aspect of the present invention includes an antenna element group that is mounted on a vehicle and is formed of a plurality of antenna elements, wherein the antenna element group constitutes a plurality of antennas capable of transmitting or receiving a plurality of electromagnetic waves by combining the plurality of antenna elements.

According to another aspect of the present invention, in the integrated antenna module, the antenna element group may constitute the plurality of antennas capable of transmitting or receiving a plurality of electromagnetic waves of different frequencies by combining the plurality of antenna elements.

According to still another aspect of the present invention, in the integrated antenna module, at least some of the plurality of antenna elements may be provided in a planar shape on a plate-like member formed in a plate shape.

According to still another aspect of the present invention, in the integrated antenna module, at least some of the plurality of antenna elements may be configured in a thin structure that is able to be incorporated inside the vehicle or in a resin member provided to be exposed to an outside of the vehicle.

According to still another aspect of the present invention, the integrated antenna module may further include a communication control module that controls an operation of the antenna element group; and a housing to which at least some of the plurality of antenna elements and at least a part of the communication control module are assembled.

According to still another aspect of the present invention, the integrated antenna module may further include an optical signal transmission unit that is interposed between the plurality of antenna elements and the communication control module, converts an electric signal into an optical signal and transmits the converted optical signal, and converts the transmitted optical signal into an electric signal.

According to still another aspect of the present invention, in the integrated antenna module, the antenna element group may include, as the plurality of antenna elements, a plurality of main antenna elements and an auxiliary antenna element provided at a different position from the plurality of main antenna elements.

According to still another aspect of the present invention, in the integrated antenna module, the antenna element group may operate in a plurality of different transmission/reception modes as the plurality of antenna elements is selectively used according to a situation.

An in-vehicle system according to still another aspect of the present invention includes an integrated antenna module that is mounted on a vehicle and capable of transmitting or receiving electromagnetic waves; and a router that is electrically connected to the integrated antenna module and relays communication between the integrated antenna module and an in-vehicle device mounted on the vehicle, wherein the integrated antenna module comprises an antenna element group formed of a plurality of antenna elements, and the antenna element group constitutes a plurality of antennas capable of transmitting or receiving a plurality of electromagnetic waves by combining the plurality of antenna elements.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment according to the present invention will be described in detail with reference to the drawings. Incidentally, the invention is not limited by the embodiment. In addition, constituent elements in the following embodiment include one that can be replaced by a person skilled in the art or substantially the same one.

Embodiment

Outline of in-Vehicle System

Figure 1:
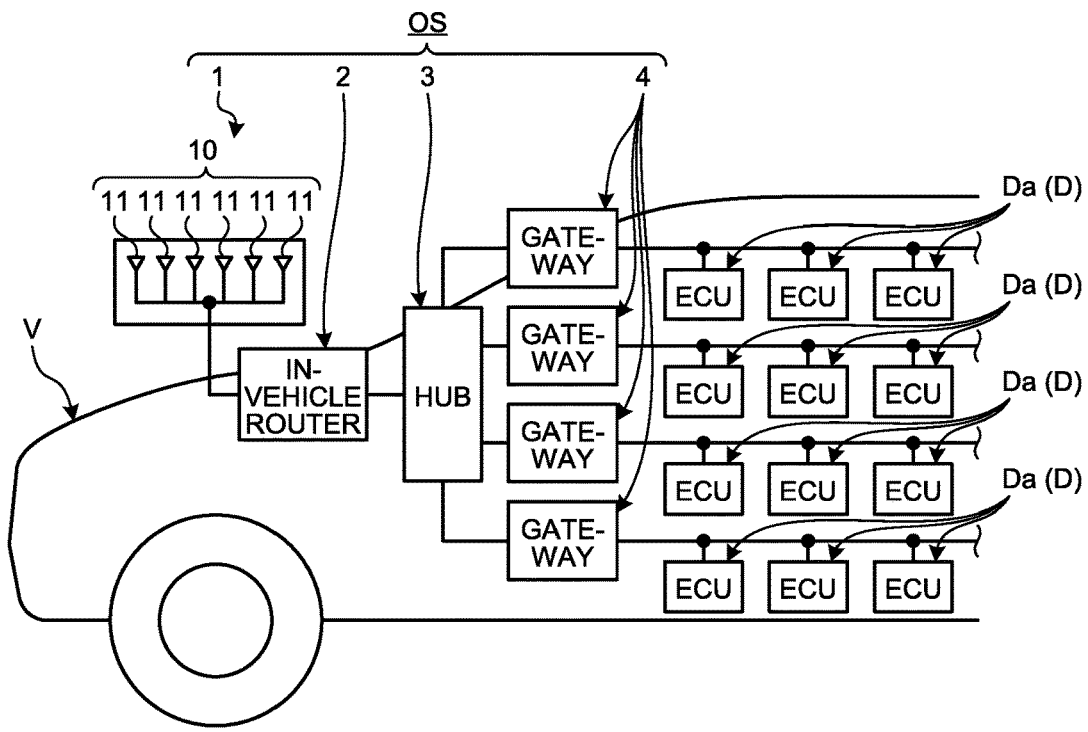
FIG. 1 is a block diagram illustrating a schematic configuration of an in-vehicle system according to an embodiment.

An in-vehicle system OS of the present embodiment illustrated in FIG. 1 is an in-vehicle network system that is mounted on a vehicle V and constitutes a vehicle communication infrastructure which is responsible for communication between inside and outside of the vehicle V. The in-vehicle system OS includes an integrated antenna module 1, an in-vehicle router (router) 2, a hub 3, and a plurality of gateways 4. The integrated antenna module 1 is capable of transmitting or receiving electromagnetic waves with an out-vehicle communication infrastructure. Accordingly, the integrated antenna module 1 enables communication between the in-vehicle system OS and the out-vehicle communication infrastructure. Here, the out-vehicle communication infrastructure is a communication infrastructure provided outside the vehicle V, and includes, for example, a communication satellite, a communication base station, a communication antenna, a roadside device, a vehicle configured to be capable of communication, and the like. The in-vehicle router 2, the hub 3, and the gateway 4 are communication relay functional parts electrically connected to the integrated antenna module 1. The in-vehicle router 2, the hub 3, and the gateway 4 are interposed between the integrated antenna module 1 and each electronic control unit (ECU) Da of a plurality of in-vehicle devices D to relay communication. Here, the in-vehicle devices D are device which are mounted on the vehicle V and realize various functions. The plurality of in-vehicle devices D may include, for example, a travel system actuator, a power supply system device, a vehicle environment device, a multi-media device, and the like. The in-vehicle systems OS are interposed from the integrated antenna module 1 side to each of the ECUs Da sides of the plurality of in-vehicle devices D in the order of the in-vehicle router 2, the hub 3, and the gateway 4. The in-vehicle router 2 is electrically connected between the integrated antenna module 1 and the hub 3, and performs so-called routing processing to allocate a signal among networks connected to the hub 3. In addition, the in-vehicle router 2 also performs protocol conversion processing to concert a protocol by aggregating mutual signals between a network on the vehicle exterior side and a network on the vehicle interior side. The hub 3 is a concentrator that is electrically connected between the in-vehicle router 2 and the plurality of gateways 4 and aggregates connection destinations of a plurality of the networks. The hub 3 distributes signals to the respective networks based on the routing processing by the in-vehicle router 2. Each of the plurality of gateways 4 is electrically connected between the hub 3 and each of the ECUs Da and performs the protocol conversion processing to mutually converting different protocols used in the networks. Here, it is illustrated that the four gateways 4 in total are provided one by one for each network. With the above configuration, the in-vehicle system OS reliably transmits a signal (information) among the out-vehicle communication infrastructure and the respective ECUs Da of the plurality of in-vehicle devices D. Further, the integrated antenna module 1 applied to the in-vehicle system OS of the present embodiment is configured such that antenna elements 11 capable of transmitting and receiving diverse electromagnetic waves are arranged to be aggregated and integrated as an antenna element group 10, thereby ensuring proper communication using these diverse electromagnetic waves. Hereinafter, each configuration of the integrated antenna module 1 will be described in detail with reference to the drawings.

Incidentally, in the in-vehicle system OS illustrated in FIG. 1, a connection method between the respective constituent elements for exchanging power supply, control signals, various types of information, and the like may be either a wired connection (for example, including optical communication via an optical fiber or the like) via a wiring material such as an electric wire and an optical fiber or wireless connection such as wireless communication and contactless power supply unless otherwise specified. In addition, the vehicle V to which the in-vehicle system OS is applied may be any vehicle using a motor or an engine as a driving source such as an electric vehicle (EV), a hybrid electric vehicle (HEV), a plug-in hybrid electric vehicle (PHEV), a gasoline vehicle, and a diesel vehicle. In addition, an operation of the vehicle V may be any of a manual operation by a driver, a semi-automatic operation, a fully-automatic operation, and the like. Typically, the in-vehicle system OS of the present embodiment is suitably applied to the vehicle V constituting a so-called connected car. The connected car is a car having a constant connection function to the Internet, a function as a so-called information and communication technology) (ICT) terminal, and the like. In addition, a functional arrangement of the above-described gateway 4 is not limited to a distributed type function arrangement as illustrated in FIG. 1, but may be a central type functional arrangement. Here, the distributed type functional arrangement is an arrangement mode in which the gateways 4 in the vehicle V are arranged for each arbitrary area (area-distributed type) or for each arbitrary domain (domain-distributed type), and the plurality of gateways 4 is associated with each other. On the other hand, the central type functional arrangement is an arrangement mode in which the gateways 4 are concentratedly arranged in one place in the vehicle V.

Basic Configuration of Integrated Antenna Module

Figure 2:
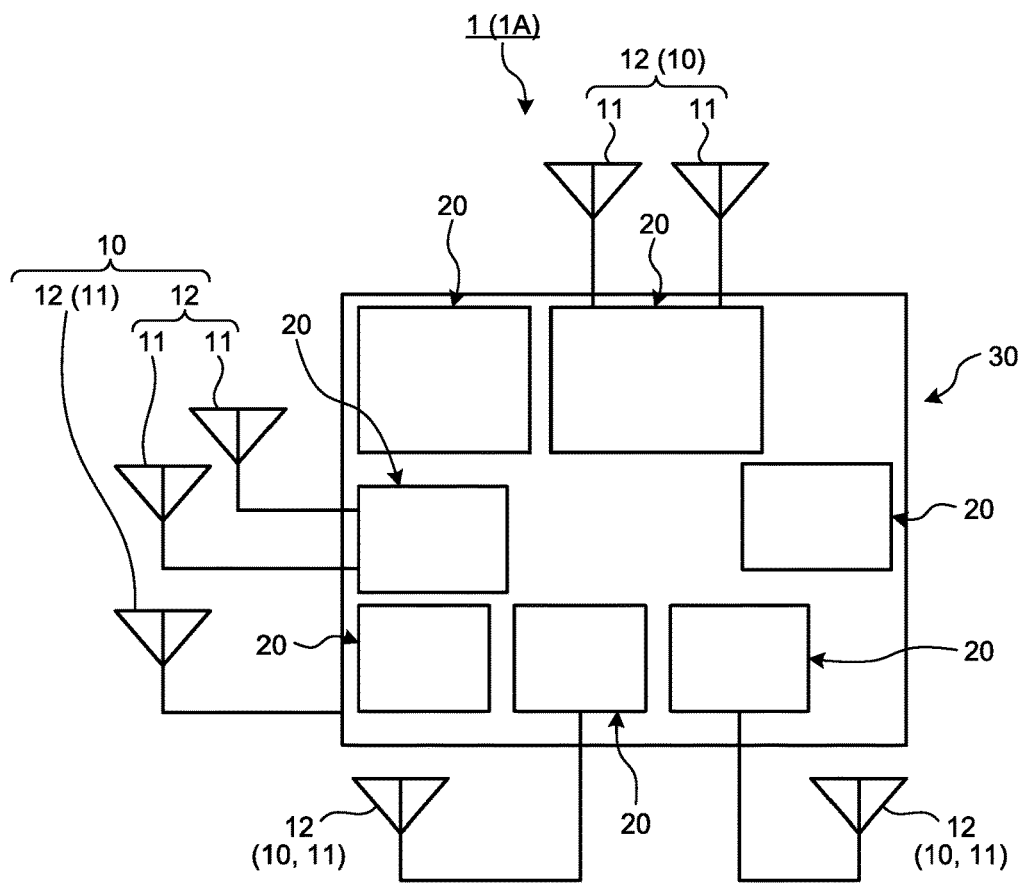
FIG. 2 is a schematic block diagram illustrating a unit configuration example of an integrated antenna module according to the embodiment.
Figure 3:
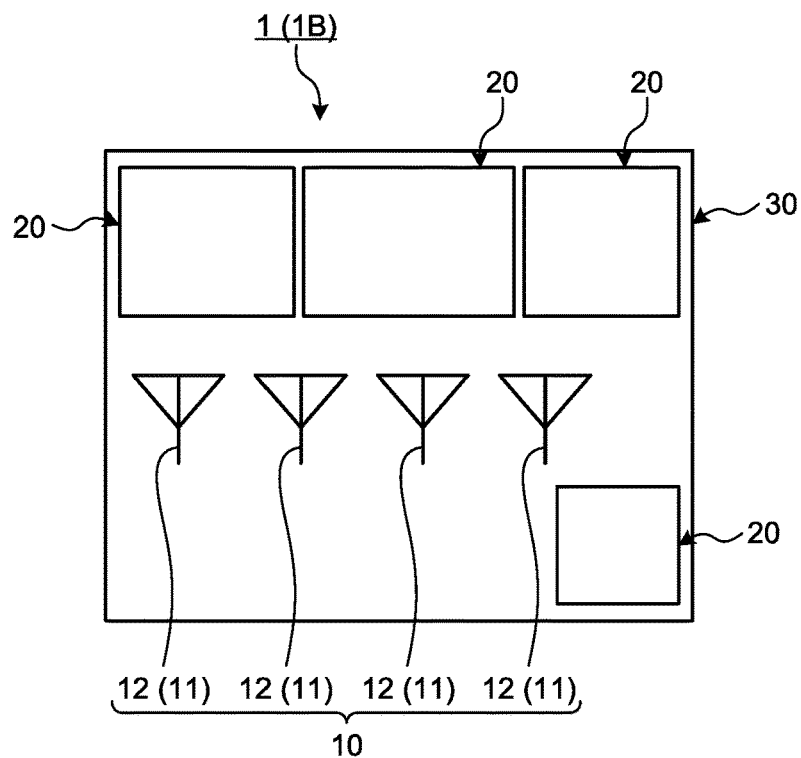
FIG. 3 is a schematic block diagram illustrating a unit configuration example of the integrated antenna module according to the embodiment.
Figure 4:
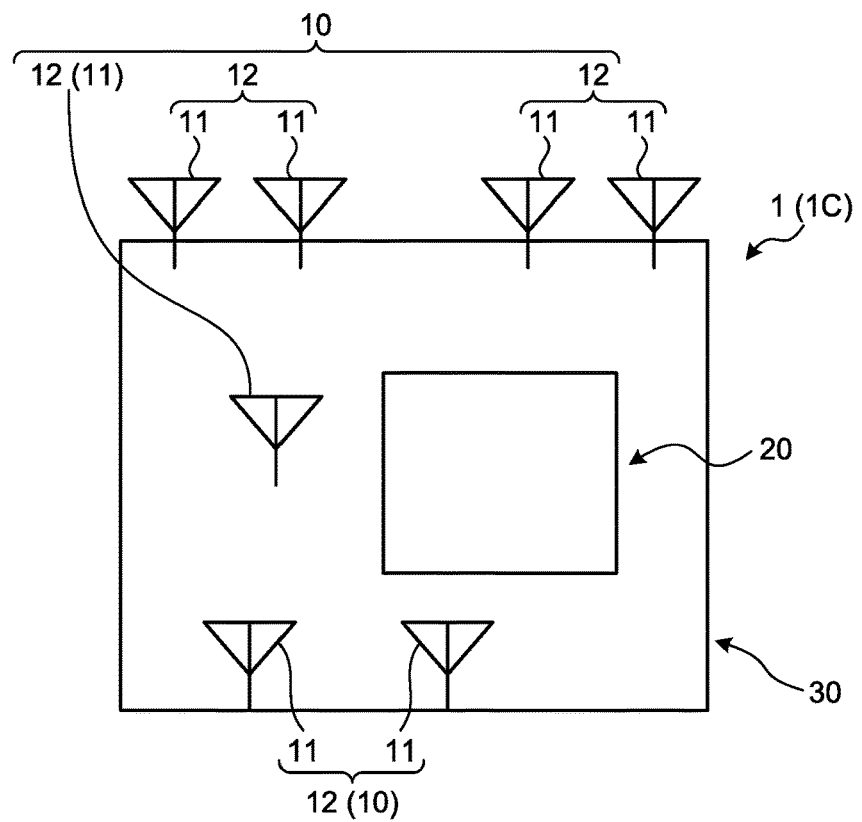
FIG. 4 is a schematic block diagram illustrating a unit configuration example of the integrated antenna module according to the embodiment.

Specifically, the integrated antenna module 1 is a structural module that is mounted on the vehicle V and configured to perform communication with the out-vehicle communication infrastructure by transmitting and receiving electromagnetic waves (radio waves) to and from the out-vehicle communication infrastructure. The integrated antenna module 1 of the present embodiment includes the antenna element groups 10 each of which is formed of the plurality of antenna elements 11, a communication control modules 20 that control operations of the antenna element groups 10, and a housing 30 as illustrated in FIGS. 2, 3, 4, and the like. The plurality of antenna elements 11 forming the antenna element group 10 constitutes a plurality of antennas 12. The integrated antenna module 1 is configured to be capable of transmitting or receiving a plurality of electromagnetic waves by this antenna element group 10. The integrated antenna module 1 of the present embodiment is configured as a multi-band compatible antenna module. That is, the integrated antenna module 1 of the present embodiment is configured to capable of transmitting or receiving electromagnetic waves of different frequencies by the antenna element group 10. Examples of the electromagnetic waves of the plurality of different frequencies to be transmitted and received by the antenna element group 10 may include electromagnetic waves of each frequency band used in a radio (AM, FM, or the like), DTV (2 K, 4 K, 8 K or the like), TEL (PCS, CDMA, LTE, WiMAX (registered trademark), 4G, 5G, or the like), satellite communication (GNSS: Global Navigation Satellite Systems (GPS, GLO-NASS, Galileo, or the like)), V2I (Vehicle to Infrastructure), V2X (Vehicle to everything), Wi-Fi (registered trademark), Bluetooth (registered trademark), and the like. In addition, examples of the electromagnetic waves of the plurality of different frequencies to be transmitted and received by the antenna element group 10 may include electromagnetic waves of each frequency band used in ETC/DSRC, VICS (registered trademark), wireless LAN, millimeter wave communication, and the like. At least some of the constituent elements of the integrated antenna module 1 are assembled to the housing 30 to be unitized as the integrated antenna module 1.

For example, the integrated antenna module 1 may be configured by assembling the plurality of communication control modules 20 with the housing 30 as illustrated in FIG. 2. For example, the integrated antenna module 1 (for convenience, will be referred to as an "integrated antenna module 1A" in some cases) illustrated in FIG. 2 has the plurality of communication control modules 20 assembled to the housing 30 to be housed and incorporated in the housing 30. Further, all the antenna elements 11 are externally attached to the housing 30 in the integrated antenna module 1A. With this configuration, the integrated antenna module 1A is configured to be unitized as a module. The integrated antenna module 1A is configured to include, for example, antennas 12 for 5G (6 GHz or less), 5G (28 GHz (so-called quasi-millimeter waves)), V2X, wireless LAN, GPS, and the like as the plurality of antennas 12 each of which is constituted by the plurality of antenna elements 11. In addition, the integrated antenna module 1A is configured to include, for example, the communication control modules 20 for 5G (6 GHz or less), 5G (28 GHz), V2X, wireless LAN, GPS, and the like as the plurality of communication control modules 20 incorporated in the housing 30.

Figure 5:
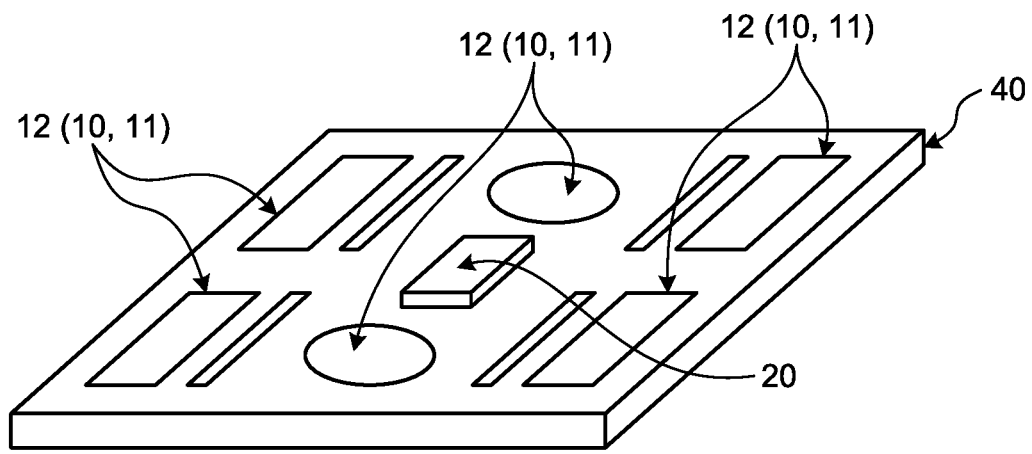
FIG. 5 is a schematic perspective view including an antenna element and a communication control module of the integrated antenna module according to the embodiment.

In addition, for example, the integrated antenna module 1 may be configured such that at least some of the plurality of antenna elements 11 and at least some of the communication control modules 20 are assembled to the housing 30 as illustrated in FIGS. 3 and 4. For example, the integrated antenna module 1 (which will be sometimes referred to as an "integrated antenna module 1B" for the sake of convenience) illustrated in FIG. 3 has all the antenna elements 11 and the plurality of communication control modules 20 assembled to the housing 30 to be housed and incorporated in the housing 30. With this configuration, the integrated antenna module 1B is configured to be unitized as a module. The integrated antenna module 1B is configured to include, for example, the antennas 12 for 5G, GPS, Wi-Fi, V2X, and the like as the plurality of antennas 12 each of which is constituted by the plurality of antenna elements 11. In addition, the integrated antenna module 1B is configured to include, for example, the communication control module 20 for 5G, GPS, Wi-Fi, V2X, and the like as the plurality of communication control modules 20 incorporated in the housing 30. On the other hand, the integrated antenna module 1 (which will be sometimes referred to as an "integrated antenna module 1C" for the sake of convenience) illustrated in FIG. 4 has some of the plurality of antenna elements 11 and the single communication control module 20 assembled to the housing 30 to be housed and incorporated in the housing 30. Further, the plurality of remaining antenna elements 11 is externally attached to the housing 30 in the integrated antenna module 1C. With this configuration, the integrated antenna module 1C is configured to be unitized as a module. The integrated antenna module 1C is configured to include, for example, the antennas 12 for 5G, GPS, and the like as the plurality of antennas 12 each of which is constituted by the plurality of antenna elements 11 incorporated in the housing 30. In addition, the integrated antenna module 1C is configured to include, for example, the antennas 12 for Wi-Fi, V2X, and the like as the plurality of antennas 12 each of which is constituted by the plurality of antenna elements 11 externally attached to the housing 30. In addition, the integrated antenna module 1C is configured to include, for example, the communication control module 20 commonly used for 5G, GPS, Wi-Fi, V2X, and the like as the single communication control module 20 incorporated in the housing 30. In this case, the integrated antenna modules 1B and 1C may be configured such that the respective antenna elements 11 and the respective communication control modules 20 incorporated in the housing 30 are mounted on the same mounting member (substrate, resin film, or the like) 40, and incorporated in the housing 30 in a batch as illustrated in FIG. 5.

Figure 6:
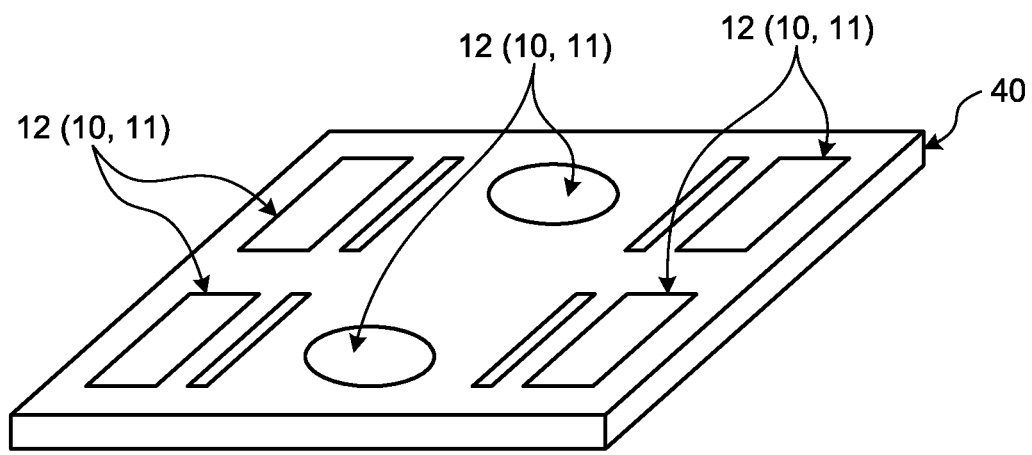
FIG. 6 is a schematic perspective view including the antenna element of the integrated antenna module according to the embodiment.

Incidentally, the integrated antenna module 1 is not limited to the above-described variations, but may include a plurality of the housings 30, for example. In this case, in the integrated antenna module 1, for example, the plurality of housings 30 unitize the antenna element group 10 and the communication control module 20, respectively, to form a plurality of submodules. Further, the integrated antenna module 1 may be configured by combining the plurality of submodules. Incidentally, the submodule will be described in more detail later with reference to FIG. 13 and the like. In addition, the integrated antenna module 1 may be configured such that the plurality of antenna elements 11 are housed and incorporated in the housing 30, and the communication control module 20 is provided outside the housing 30. In this case, the respective antenna elements 11 to be incorporated in the housing 30 are mounted on the mounting member 40 solely and is incorporated in the housing 30 in the integrated antenna module 1, for example, as illustrated in FIG. 6.

Figure 7:
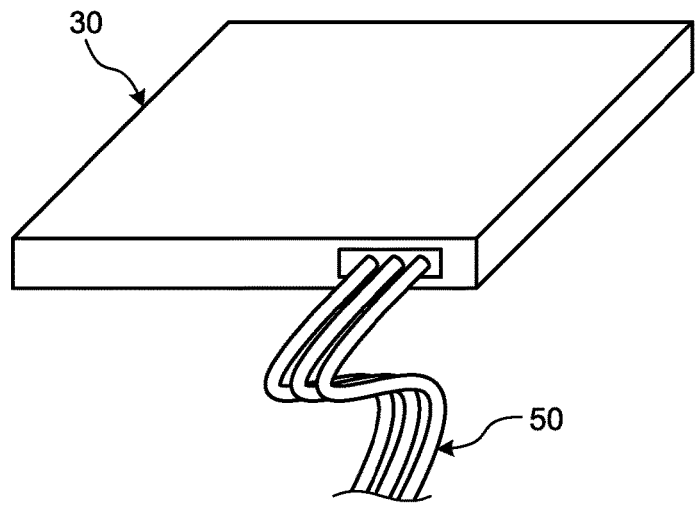
FIG. 7 is a schematic perspective view including a housing and a cable of the integrated antenna module according to the embodiment.

As illustrated in FIG. 7, the integrated antenna module 1 includes a cable 50 led from the housing 30. The cable 50 is a routing material forming a transmission path for transmission of various signals. The cable 50 is connected to the antenna element 11, the communication control module 20, and the like incorporated in the housing 30. The cable 50 is constituted by, for example, various electric wires and planar circuit bodies (for example, flexible printed circuits (FPC), a flexible flat cable (FFC), and the like) used for signal communication, an optical fiber, and the like.

Basic Configuration of Antenna Element Group

Next, the configuration of the antenna element group 10 will be described in more detail. As illustrated in FIGS. 2, 3, 4, and the like, the plurality of antenna elements 11 is combined to constitute the plurality of antennas 12 capable of transmitting or receiving a plurality of electromagnetic waves in the antenna element group 10. In the antenna element group 10 of the present embodiment, the plurality of antenna elements 11 is combined to constitute the plurality of antennas 12 capable of transmitting or receiving the plurality of electromagnetic waves of different frequencies. In other words, the antenna element group 10 is obtained by aggregating and integrating the plurality of antenna elements 11, as a group (lump), constituting the plurality of antennas 12 capable of transmitting or receiving the plurality of electromagnetic waves of different frequencies.

The antenna element 11 is an element constituting the antenna 12. The antenna element 11 is typically configured using a conductive member having a conductivity. The antenna element 11 is configured using, for example, a linear bar-shaped conductor, a conductive pattern provided on a dielectric such as the mounting member 40 (see FIG. 5 and the like), or the like. The antenna 12 radiates (transmits) high-frequency energy to a space as electromagnetic waves (radio waves), and mutually converts (receives) the electromagnetic waves (radio waves) of the space into high-frequency energy. The antenna 12 is constituted by the single antenna element 11 or the plurality of combined antenna elements 11.

The antenna element 11 may constitute the antenna 12 capable of transmitting and receiving an electromagnetic wave of a specific frequency as a single body. In addition, the plurality of antenna elements 11 may be combined to constitute the antenna 12 capable of transmitting and receiving an electromagnetic wave of a specific frequency. To be more specific, the antenna element 11 may constituted the antenna 12 capable of transmitting an and receiving electromagnetic wave of a specific frequency as a single body, and the plurality of antenna elements 11 may be combined to constitute another antenna 12 capable of transmitting and receiving electromagnetic waves of different frequencies. In addition, the antenna element 11 does not constitute the antenna 12 as a single body, but only when the plurality of antenna elements 11 is combined to constitute the antenna 12, the antenna 12 may transmit and receive an electromagnetic wave of a specific frequency. For example, in the antenna element group 10, it is possible not only to cause the respective antenna elements 11 to function as the entirety or a part of the single independent antenna 12 that transmits and receives individual electromagnetic waves but also to cause the respective antenna elements 11 to also function as the entirety or a part of another different antenna 12 by changing the combination of the antenna elements 11. As will be described later, the antenna element group 10 can be configured such that the plurality of antenna elements 11 is selectively used according to a situation and operate in a plurality of different transmission/reception modes.

The antenna 12 constituted by the antenna element 11 can adopt various forms. The antenna 12 may adopt any form of a balanced antenna in which charges are symmetrically distributed, an unbalanced antenna in which charges are distributed asymmetrically, and the like. In addition, the antenna 12 may adopt any form of a linear antenna, a plate-like antenna, a planar antenna, an aperture antenna, and the like. In addition, the antenna 12 may adopt any form of a micro strip antenna (patch antenna), an inverted-F antenna, a magnetic current dipole antenna, and the like. In addition, the antenna 12 may constitute a multi-resonant antenna. In addition, the antenna 12 may constitute a directional control antenna, a broadband antenna, or the like. It is preferable to perform reduction in size, reduction in weight, reduction in thickness, flattening, and an increase in sensitivity of the antenna element 11 and the antenna 12 in order to improve the mountability and installability to the vehicle V. In addition, it is also preferable that the antenna element 11 and the antenna 12 have exterior designs that do not affect the appearance of the vehicle V and the like.

Planar Film Antenna

Figure 8:
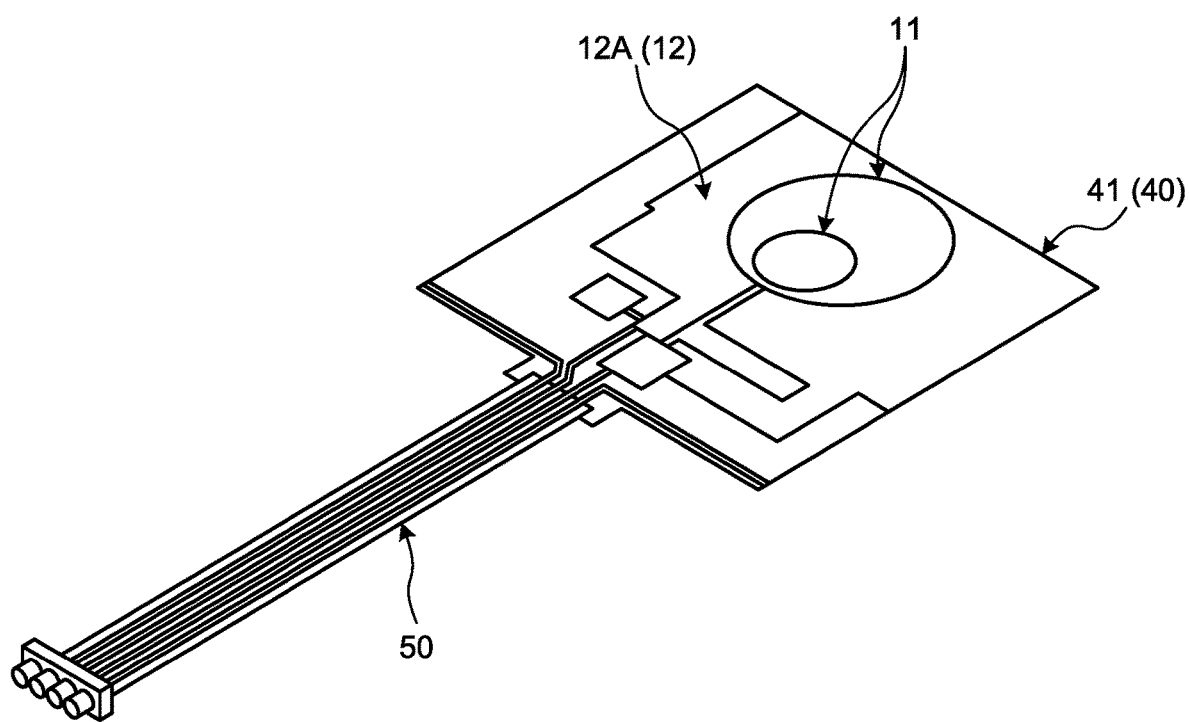
FIG. 8 is a schematic perspective view illustrating a specific example of a planar film antenna of the integrated antenna module according to the embodiment.

For example, at least some of the plurality of antenna elements 11 of the present embodiment are preferably provided in a planar shape on a plate-like member formed in a plate shape as illustrated in FIG. 8. Here, at least some of the plurality of antenna elements 11 provided in a planar shape on a sheet-like resin film 41 serving as the plate-like member having the plate shape, is exemplified. The resin film 41 constitutes the mounting member 40, and is formed in a sheet shape of a thin film with a resin material having insulating properties. The resin film 41 can be made of various thin resin films having flexibility, for example, a polyethylene terephthalate (PET) resin, a polycarbonate (PC) resin, a polyethylene (PE) resin, a polypropylene (PP) resin, a polyimide (PI) resin, and the like. In this case, the antenna element 11 is configured using, for example, a conductive printing pattern or the like formed of a conductor such as a silver paste printed on the surface of the resin film 41. As a result, the antenna element 11 provided on the resin film 41 constitutes a thin planar film antenna 12A as the antenna 12. With this configuration, the antenna element group 10 and the planar film antenna 12A (antenna 12) can achieve the reduction in size, reduction in weight, reduction in thickness, and flattening as described above, which enables the improvement of the mountability and installability to the vehicle V. In this case, the antenna element group 10 and the planar film antenna 12A can also improve shape conformability at an installation position, and it is possible to improve the mountability and installability to the vehicle V in this respect as well. The planar film antenna 12A is connected to the above-described cable 50, and various signals are transmitted via the transmission path formed by the cable 50. In addition, it is more preferable that at least some of the plurality of antenna elements 11 be configured in a thin structure that can be incorporated in a narrow space as will be described later. For example, the planar film antenna 12A described above is configured in the thin structure. Here, the thin structure is a structure having a thickness of the extent that can be incorporated in a gap between a car body of the vehicle V and the interior or various parts, and is preferably a structure in which a thickness in the thickness direction of the mounting member 40 (the resin film 41 or the like) is set to 2 cm or smaller (and within a range that can be manufactured). With this configuration, the antenna element group 10 and the planar film antenna 12A (antenna 12) can be incorporated in a narrow space. Incidentally, the description has been given by exemplifying the resin film 41 as the plate-like member here, but the invention is not limited thereto. The plate-like member may be the mounting member 40 illustrated in FIGS. 5 and 6, for example, a substrate or the like that is more rigid than the resin film 41. In this case, each of the antenna elements 11 mounted on the substrate constituting the mounting member 40 is provided in a planar shape on the substrate which is a plate-like member having a plate shape, and the antenna 12 constituted by the respective antenna elements 11 constitutes a so-called planar antenna.

Additional Item 1 of Antenna Element Group: Interference Countermeasure

Incidentally, the antenna element group 10 may be configured to include an interference countermeasure structure between the adjacent antenna elements 11 in order to aggregate and integrate the plurality of antenna elements 11 densely in as narrow a region as possible. In other words, since the antenna element group 10 includes the interference countermeasure structure between the adjacent antenna elements 11, it is possible to aggregate and integrate the plurality of antenna elements 11 densely in as narrow a region as possible. The antenna element group 10 may be configured to include various filters, for example, a microstrip filter and the like, as the interference countermeasure structure. For example, the above-described planar film antenna 12A may be configured using a conductive printing pattern or the like, as the interference countermeasure structure, in which a coil (L) element and a capacitor (C) element for constituting an LC filter circuit are printed on the surface of the resin film 41.

Additional Item 2 of Antenna Element Group: Utilization of Metamaterial

In addition, a so-called metamaterial may be used as the antenna element group 10. The metamaterial is typically an artificial substance that exhibits behavior that a substance in the natural world does not have against electromagnetic waves including light. For example, in the antenna element group 10, the mounting member 40 such as the resin film 41 may be made of a material having a negative dielectric constant and a negative magnetic coefficient that are not in the natural world as the metamaterial. With this configuration, the antenna element group 10 can improve interference suppression performance the communication performance, and further enhance the functionality and reduce the size.

Additional Item 3 of Antenna Element Group: Extensibility

Figure 9:
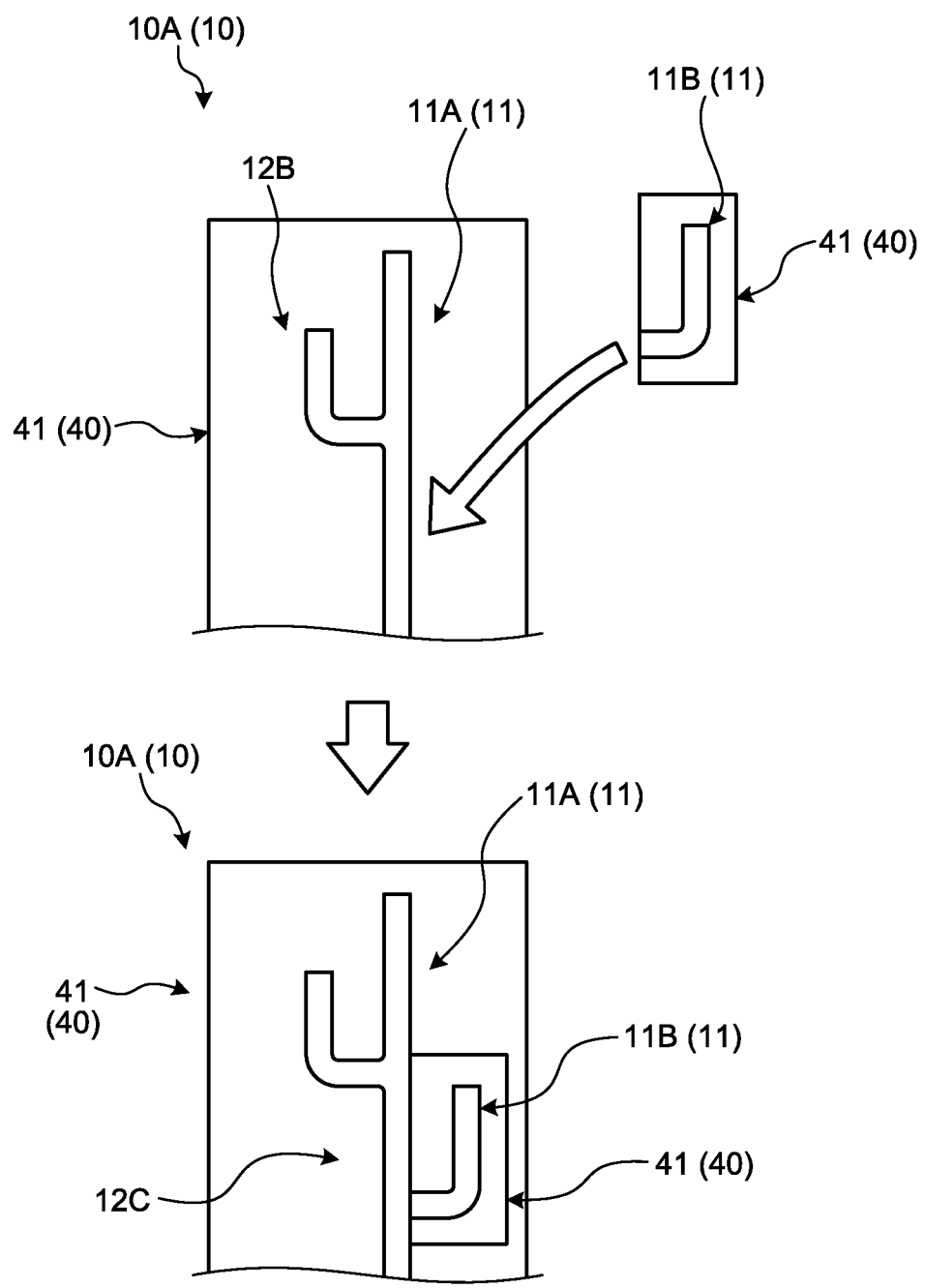
FIG. 9 is a schematic diagram illustrating a specific example of expandability of an antenna element group of the integrated antenna module according to the embodiment.

In addition, the antenna element group 10 may be provided with the antenna element 11 (which will be sometimes referred to as an "antenna element 11B" for the sake of convenience) by retrofitting for the existing antenna element 11 (which will be sometimes referred to as an "antenna element 11A" for the sake of convenience), for example, as illustrated in FIG. 9. For example, an antenna 12B is constituted by the existing antenna element 11A provided on a first resin film 41 in the antenna element group 10 (which will be sometimes referred to as an "antenna element group 10A" for the sake of convenience) illustrated in FIG. 9, which is similar to the above-described planar film antenna 12A. In this state, a second resin film 41 provided with the branch-like retrofitted antenna element 11B is affixed to be adjacent to the existing antenna element 11A in the antenna element group 10A. In this case, the second resin film 41 is affixed to the first resin film 41 in a positional relationship in which the antenna element 11B is connected to the antenna element 11A in the antenna element group 10A. With this configuration, an antenna 12C capable of transmitting and receiving an electromagnetic wave of a frequency different from that of the antenna 12B is constituted by the antenna element 11A and the antenna element 11B in the antenna element group 10A. That is, the antenna element group 10A after retrofitting is configured to include the first resin film 41 and the second resin film 41 affixed to the first resin film 41. Further, the antenna element group 10A after retrofitting is configured to include the first antenna element 11A which is provided on the first resin film 41 and the second antenna element 11B which is provided on the second resin film 41 and connected to the first antenna element 11A to constitute the antenna 12C. As described above, the antenna element group 10A can ensure the expandability by the retrofitted antenna element 11B and the second resin film 41, and properly deal with, for example, electromagnetic waves of a new frequency added by a new communication method or the like. With this configuration, the antenna element group 10A can also ensure diversity (variations) in response to the specifications of the vehicle V to be applied or the like and improve versatility by standardizing and sharing the antenna element group 10A as much as possible regardless of the specifications of the applied vehicle V or the like. Incidentally, the antenna element group 10 can ensure the expandability even by replacing the planar film antenna 12A or the like incorporated in the housing 30 itself while keeping the housing 30 common, for example, without being limited to the example illustrated in FIG. 9.

Basic Configuration of Communication Control Module

Figure 10:
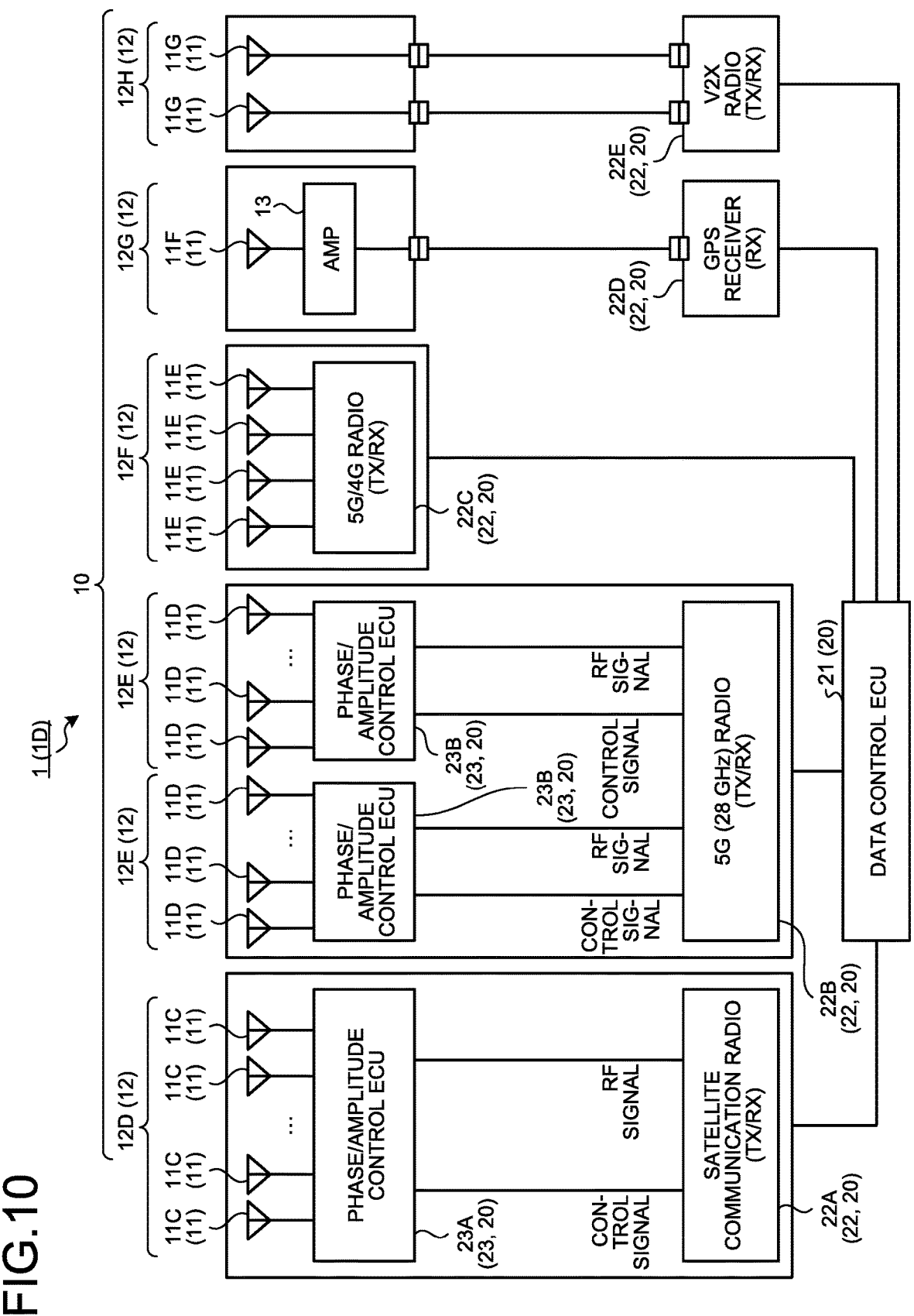
FIG. 10 is a schematic block diagram illustrating a configuration example of a communication control module of the integrated antenna module according to the embodiment.
Figure 11:
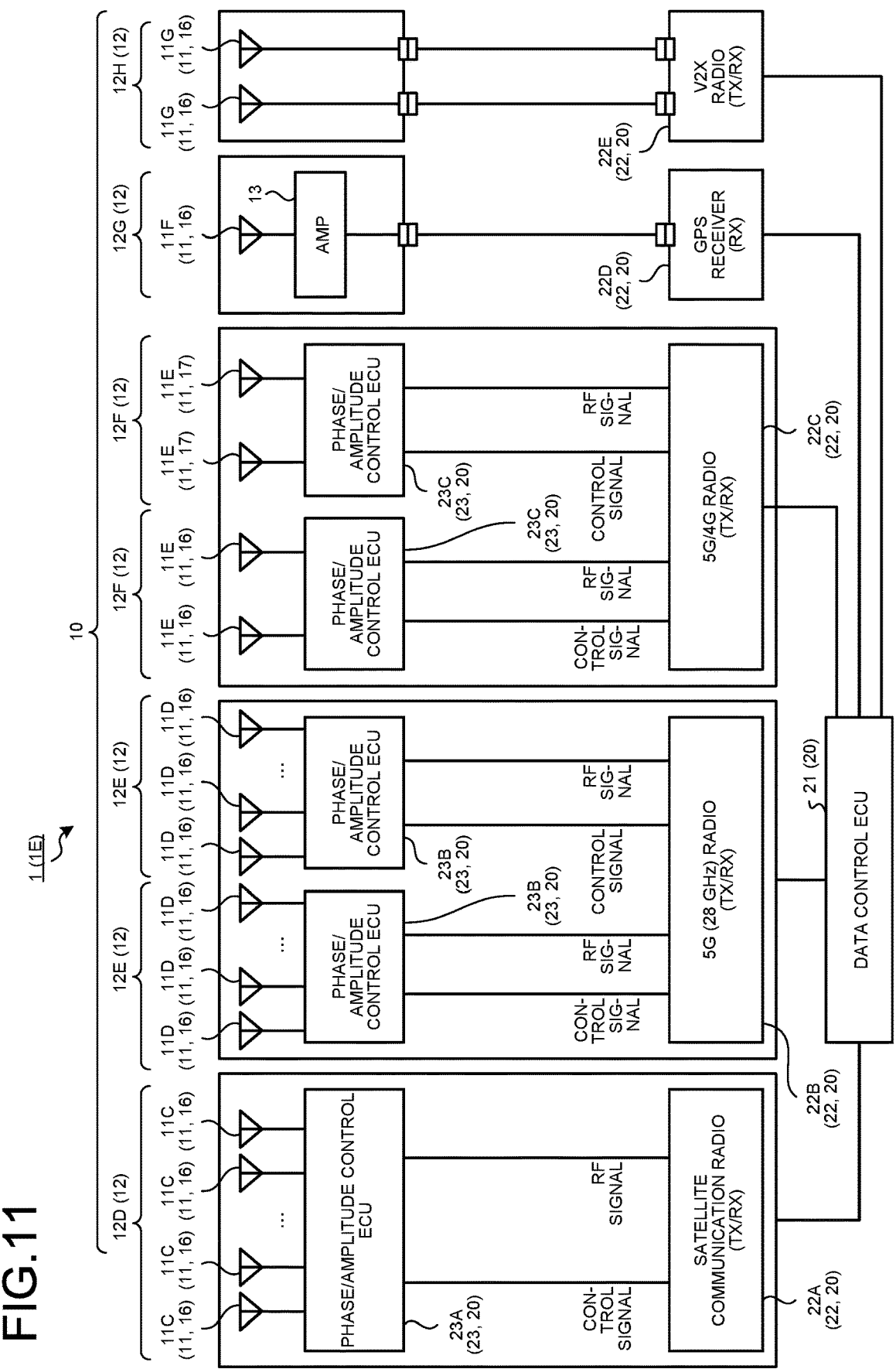
FIG. 11 is a schematic block diagram illustrating a configuration example of the communication control module of the integrated antenna module according to the embodiment.

Next, the configuration of the communication control module 20 will be described in more detail. The communication control module 20 is a structural module that controls the operation of the antenna element group 10 as described above. More specifically, the communication control module 20 controls the operation of each unit including the plurality of antenna elements 11 constituting the antenna element group 10. As illustrated in FIGS. 10 and 11, for example, the communication control module 20 includes a data control ECU 21, a transmission/reception circuit 22, a phase/amplitude control ECU 23, and the like. The data control ECU 21 comprehensively controls communication in the integrated antenna module 1. For example, the data control ECU 21 is configured using an electronic circuit having a well-known microcomputer including a central computation processing device such as a central processing unit (CPU) as a main body. The data control ECU 21 is electrically connected to the respective units of the integrated antenna module 1 such as the transmission/reception circuit 22, the phase/amplitude control ECU 23, and the like, and controls an operation thereof. The data control ECU 21 also performs switching of a plurality of different transmission/reception modes to be described later and the like. The transmission/reception circuit 22 is a circuit configured to modulate and demodulate a signal transmitted and received via the antenna 12, and operates under the control of the data control ECU 21. The phase/amplitude control ECU 23 is a control unit configured to control a directivity of the antenna 12 by adjusting a phase and an amplitude of the signal transmitted and received via the antenna 12. Here, the directivity of the antenna 12 represents a relationship between a radiation direction and a radiation intensity of an electromagnetic wave in the antenna 12. The phase/amplitude control ECU 23 is configured to include an electronic circuit having a well-known microcomputer including a central computation processing device such as a CPU as a main body, a phase adjuster, an attenuator, and the like. The phase/amplitude control ECU 23 adjusts the phase and the amplitude of the signal transmitted and received via the antenna 12 based on the control by the data control ECU 21 or the like to control the directivity of the antenna 12, thereby changing a transmission/reception range and a direction of the antenna 12.

For example, in the integrated antenna module 1 (which will be sometimes referred to as an "integrated antenna module 1D" for the sake of convenience) illustrated in FIG. 10, one satellite communication antenna 12D is constituted by a plurality of antenna elements 11C among the plurality of antenna elements 11 of the antenna element group 10. In addition, two 5G (28 GHz) antennas 12E are constituted by a plurality of antenna elements 11D among the plurality of antenna elements 11 of the antenna element group 10 in the integrated antenna module 1D. In addition, one 5G (6 GHz or less)/4G antenna 12F is constituted by a plurality of antenna elements 11E among the plurality of antenna elements 11 of the antenna element group 10 in the integrated antenna module 1D. In addition, one GPS antenna element 12G is configured using an antenna element 11F among the plurality of antenna elements 11 of the antenna element group 10 in the integrated antenna module 1D. In addition, one V2X antenna 12H is constituted by a plurality of antenna elements 11G among the plurality of antenna elements 11 of the antenna element group 10 in the integrated antenna module 1D. Further, the integrated antenna module 1D is configured to include the data control ECU 21, the plurality of transmission/reception circuits 22, and the plurality of phase/amplitude control ECUs 23 as the communication control modules 20. The phase/amplitude control ECU 23 is configured to include one phase/amplitude control ECU 23A for satellite communication and two phase/amplitude control ECUs 23B for 5G (28 GHz). The phase/amplitude control ECU 23A is connected to the antenna 12D and controls a directivity of the antenna 12D. The two phase/amplitude control ECUs 23B are connected to the antennas 12E, respectively, and control a directivity of each of the antennas 12E. The transmission/reception circuit 22 is configured to include a satellite communication radio (TX/RX) 22A, a 5G (28 GHz) radio (TX/RX) 22B, a 5G (6 GHz or less)/4G radio (TX/RX) 22C, a GPS receiver (RX) 22D, and a V2X radio (TX/RX) 22E. The satellite communication radio (TX/RX) 22A is connected to the phase/amplitude control ECU 23A, and transmits and receives a control signal for control of the phase/amplitude control ECU 23A between the satellite communication radio (TX/RX) 22A and the phase/amplitude control ECU 23A and a radio frequency/high frequency (RF) signal transmitted and received by the antenna 12D (a radio signal transmitted and received by wireless communication via the antenna 12). The 5G (28 GHz) radio (TX/RX) 22B is connected to the two phase/amplitude control ECUs 23B, and transmits and receives a control signal for control of the phase/amplitude control ECU 23B between the 5G (28 GHz) radio (TX/RX) 22B and each of the phase/amplitude controls ECU 23B and an RF signal transmitted and received by the antenna 12E. The 5G (6 GHz or less)/4G radio (TX/RX) 22C is connected to the antenna 12F and transmits and receives a signal transmitted and received by the antenna 12F between the 5G (6 GHz or less)/4G radio (TX/RX) 22C and the antenna 12F. The GPS receiver (RX) 22D is connected to the antenna 12G via the amplifier (AMP) 13, and transmits and receives a signal received by the antenna 12G between the GPS receiver (RX) 22D and the antenna 12G. The V2X radio (TX/RX) 22E is connected to the antenna 12H, and transmits and receives a signal transmitted and received by the antenna 12H between the V2X radio (TX/RX) 22E and the antenna 12H. Further, the single data control ECU 21 is provided to be shared for satellite communication, 5G (28 GHz), 5G (6 GHz or less)/4G, GPS, and V2X. Incidentally, the data control ECU 21 may be individually provided in response to each of satellite communication, 5G (28 GHz), 5G (6 GHz or less)/4G, GPS, and V2X.

For example, the integrated antenna module 1 (which will be sometimes referred to as an "integrated antenna module 1E" for the sake of convenience) illustrated in FIG. 11 is different from the integrated antenna module 1D in terms that two 5G (6 GHz or less)/4G antennas 12F are provided. In addition, the integrated antenna module 1E is also different from the integrated antenna module 1D in terms that the phase/amplitude control ECU 23 is configured to further include two phase/amplitude control ECUs 23C for 5G (6 GHz or less)/4G. Other configurations of the integrated antenna module 1E are substantially the same as those of the integrated antenna module 1D. The two phase/amplitude control ECUs 23C are respectively connected to the antennas 12F and control a directivity of each of the antennas 12F. Further, the 5G (6 GHz or less)/4G radio (TX/RX) 22C is connected to the two phase/amplitude control ECUs 23C, and transmits and receives a control signal for control of each of the phase/amplitude control ECUs 23C between the 5G (6 GHz or less)/4G radio (TX/RX) 22C and each of the phase/amplitude control ECUs 23C and an RF signal transmitted and received by each of the antennas 12F.

Arrangement of Each Configuration

Figure 12:
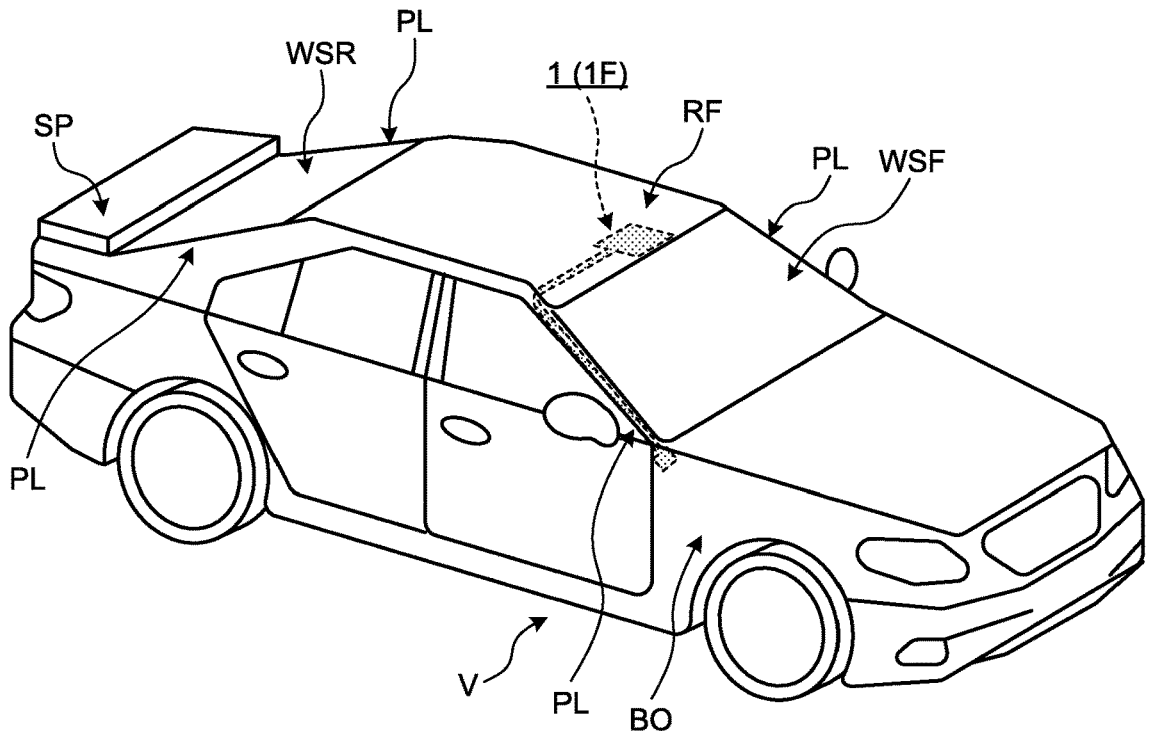
FIG. 12 is a schematic perspective view illustrating an arrangement example of the integrated antenna module according to the embodiment.
Figure 13:
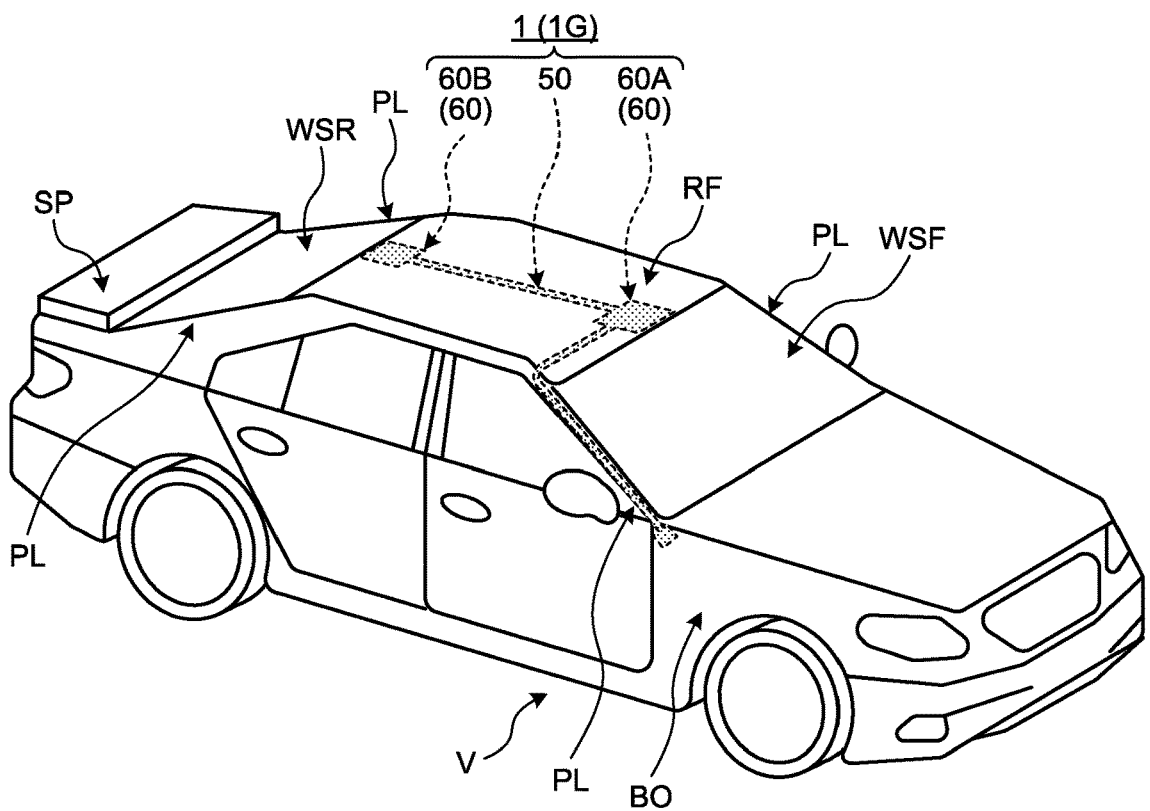
FIG. 13 is a schematic perspective view illustrating an arrangement example of the integrated antenna module according to the embodiment.
Figure 14:
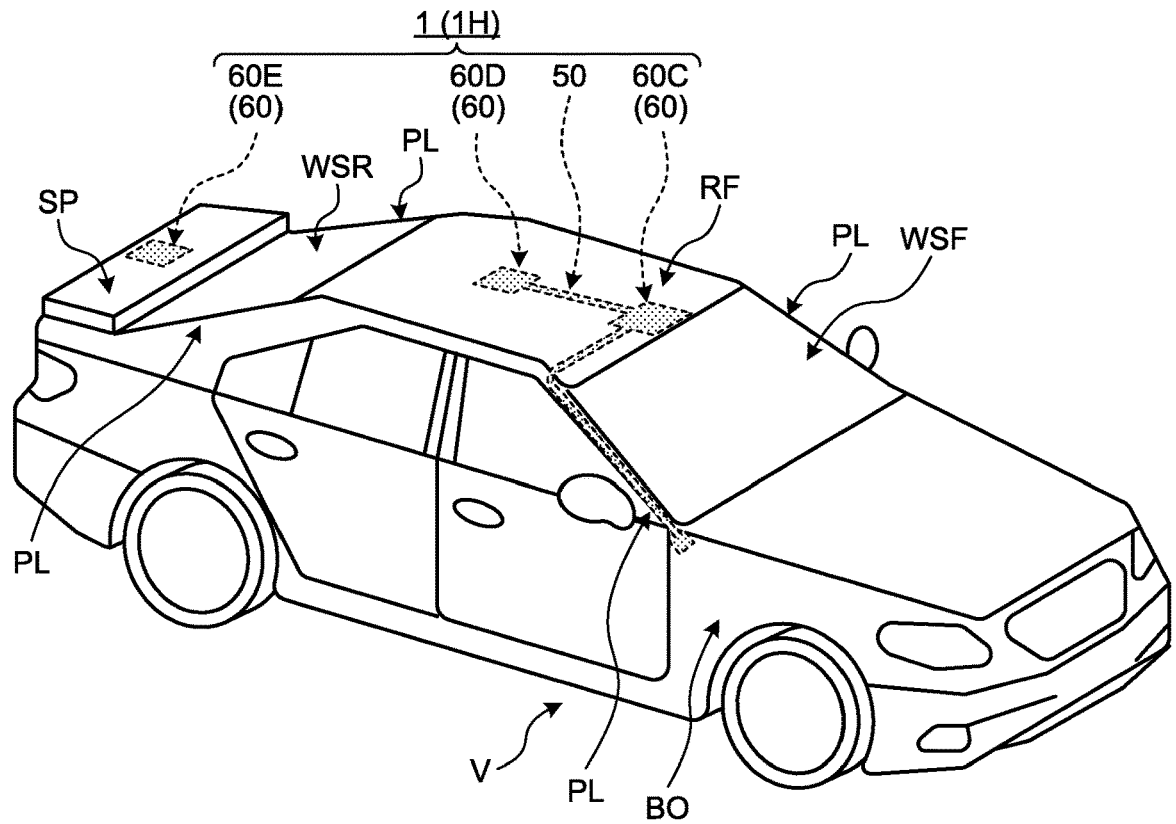
FIG. 14 is a schematic perspective view illustrating an arrangement example of the integrated antenna module according to the embodiment.

Next, the arrangement of the integrated antenna module 1 configured as described above will be described. Typically, the integrated antenna module 1 is preferably arranged at an optimum part that is hardly damaged at the time of an accident of the vehicle V or the like, the optimum part where it is easy to perform transmission and reception of electromagnetic waves in the vehicle V. As illustrated in FIG. 12, the integrated antenna module 1 may be arranged in a concentrated manner on one side of the vehicle V. In addition, in the vehicle V, the integrated antenna module 1 may be dispersedly arranged to be divided into a plurality of submodules 60 as illustrated in FIGS. 13 and 14. The integrated antenna module 1 can optimize directional characteristics of the antenna 12, for example, for the entire vehicle V by being dispersedly arranged to be divided into the plurality of submodules 60.

For example, the integrated antenna module 1 (which will be sometimes referred to as an "integrated antenna module 1F" for the sake of convenience) illustrated in FIG. 12 is arranged to be concentrated on a roof member RF of the vehicle V as an optimum part that is hardly damaged at the time of an accident of the vehicle V or the like, the optimum part where it is easiest to perform transmission and reception of electromagnetic waves in the vehicle V. Here, the roof member RF is a structural body positioned on the upper side in the vertical direction in the vehicle V and constituting the exterior of the vehicle V. The roof member RF is connected to a vehicle body main body BO via a plurality of pillars PL each of which is formed in a hollow pillar shape, and is supported on the upper side in the vertical direction of the vehicle body main body BO. The vehicle V is divided into an outdoor side and an indoor side with the roof member RF as a boundary on the vertical improvement side. The integrated antenna module 1F is provided on a surface on the indoor side of the roof member RF. For example, the integrated antenna module 1F is arranged in a space defined between an interior material such as a roof liner (trim) provided on the indoor side and the roof member RF. Here, the integrated antenna module 1F is provided at an intersection of a windshield WSF on the front side of the vehicle V and the roof member RF at a substantially central position in a vehicle width direction of the vehicle V. The windshield WSF is a light transmissive member that transmits light. The windshield WSF is provided at a front portion of the vehicle V and serves as a boundary between the inside and the outside of the vehicle V, and is also called a front glass. The integrated antenna module 1F may be configured as a part of a so-called over-head module (OHM) (which will be sometimes abbreviated as "OHM" hereinafter) provided at the same part. The integrated antenna module 1F is electrically connected to various devices via a routing material routed in an inner space of the pillar PL having the hollow pillar shape, for example, to perform power supply and signal communication.

On the other hand, the integrated antenna module 1 (which will be sometimes referred to as an "integrated antenna module 1G" for the sake of convenience) illustrated in FIG. 13 is arranged dispersedly in a plurality of parts of the roof member RF of the vehicle V to be divided into two submodules 60A and 60B. The submodules 60A and 60B constitute the integrated antenna module 1G. For example, the submodule 60A is configured to include the antenna elements 11 constituting the above-described V2X, Wi-Fi, and 5G (28 GHz) antennas 12, the communication control module 20, the housing 30, and the like. On the other hand, for example, the submodule 60B is configured to include the antenna elements 11 constituting the 5G (6 GHz or less)/4G and GPS antennas 12, the communication control module 20, the housing 30, and the like. Incidentally, the submodule 60B may be configured to include only the antenna elements 11 constituting the antenna 12 without including the communication control module 20, the housing 30, and the like with the various communication control modules 20 and the like provided on the submodule 60A side, for example. Both the submodules 60A and 60B are arranged in the space defined between the interior material and the roof member RF provided on the indoor side, which is similar to the integrated antenna module 1F. Further, the submodule 60A is provided at the intersection of the windshield WSF on the front side of the vehicle V and the roof member RF at the substantially central position in the vehicle width direction of the vehicle V, which is similar to the integrated antenna module 1F. The submodule 60A may be configured as a part of the OHM, which is similar to the integrated antenna module 1F. Here, the submodule 60B is provided at an intersection of a windshield WSR on the rear side of the vehicle V and the roof member RF at a substantially central position in a vehicle width direction of the vehicle V. The windshield WSR is a light transmissive member that transmits light, which is similar to the windshield WSF. The windshield WSR is provided at a rear portion of the vehicle V and serves as a boundary between the inside and the outside of the vehicle V, and is also called a rear glass. The submodule 60B may be configured as a part of a so-called rear-head module (RHM) (which will be sometimes abbreviated as "RHM" hereinafter) provided at the same part. In the integrated antenna module 1G, the submodule 60A and the submodule 60B arranged as described above are connected via the cable 50 or the like.

In addition, the integrated antenna module 1 (which will be sometimes referred to as an "integrated antenna module 1H" for the sake of convenience) illustrated in FIG. 14 is arranged dispersedly in a plurality of parts of the roof member RF, a spoiler SP, and the like of the vehicle V to be divided into three submodules 60C, 60D, and 60E. The spoiler SP is a so-called aero part configured to reduce a lift of the vehicle V, and is provided so as to be exposed to the outside of the vehicle V. Here, the spoiler SP is provided so as to be exposed to the outside in the rear portion of the vehicle V, and is also called a rear spoiler. The spoiler SP corresponds to a part where it is easy to perform transmission and reception of electromagnetic waves in the vehicle V. The submodules 60C, 60D, and 60E constitute the integrated antenna module 1H. For example, the submodule 60C is configured to include the antenna elements 11 constituting the above-described V2X, Wi-Fi, and 5G (28 GHz) antennas 12, the communication control module 20, the housing 30, and the like, which is similar to submodule 60A. In addition, for example, the submodule 60D is configured to include the antenna elements 11 constituting the 5G (6 GHz or less)/4G and GPS antennas 12, the communication control module 20, the housing 30, and the like, which is similar to the submodule 60B. In addition, for example, the submodule 60E is configured to include the antenna elements 11 constituting the V2X and 5G (28 GHz) antennas 12, the communication control module 20, the housing 30, and the like. Incidentally, the submodules 60D and 60E may be configured to include only the antenna elements 11 constituting the antenna 12 without including the communication control module 20, the housing 30, and the like with the various communication control modules 20 provided on the submodule 60C side, for example, which is similar to the above-described submodule 60B. Both the submodules 60C and 60D are arranged in the space defined between the interior material and the roof member RF provided on the indoor side, which is similar to the submodules 60A and 60B. Further, the submodule 60C is provided at the intersection of the windshield WSF on the front side of the vehicle V and the roof member RF at the substantially central position in the vehicle width direction of the vehicle V, which is similar to the submodule 60A. The submodule 60C may be configured as a part of the OHM, which is similar to the submodule 60A. On the other hand, the submodule 60D is provided at a substantially central position in a front-rear direction and the vehicle width direction of the roof member RF, which is different from the submodule 60B. The submodule 60D may be configured as a part of a so-called map lamp (MP) (which will be sometimes abbreviated as "MP" hereinafter) provided at the same part. Further, the submodule 60E is provided to be incorporated in the spoiler SP. In the integrated antenna module 1H, the submodule 60C, the submodule 60D, and the submodule 60E arranged as described above are connected via the cable 50 (a part of which is not illustrated) or the like.

Figure 15:
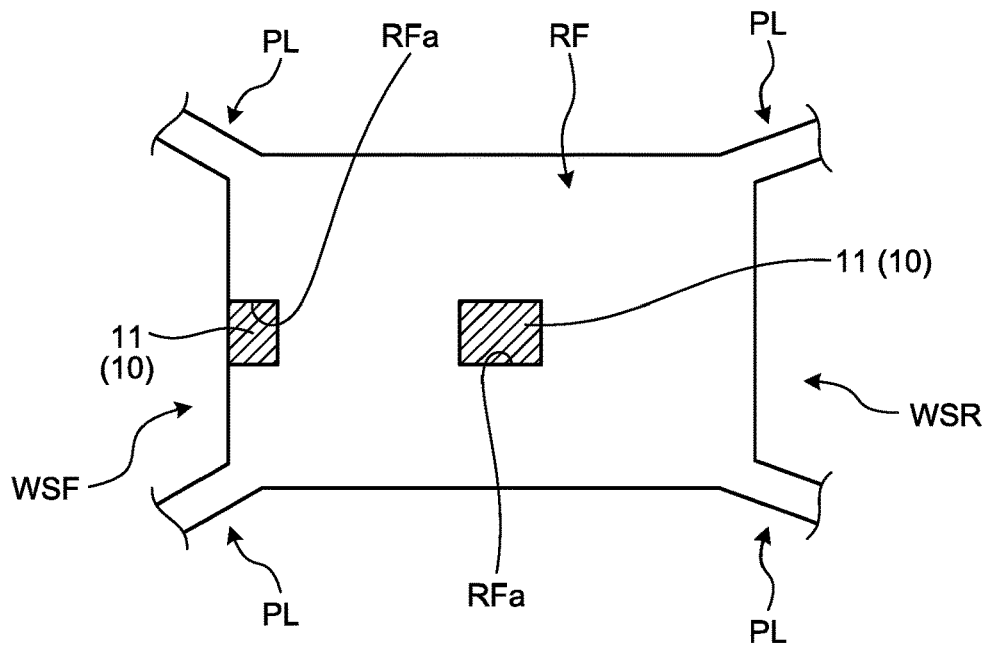
FIG. 15 is a schematic diagram illustrating a roof member on which the integrated antenna module according to the embodiment is mounted.

Incidentally, when the roof member RF is made of a metal material, the antenna element 11 in the integrated antenna module 1 is preferably provided in an installation through portion RFa provided in the roof member RF as illustrated in FIG. 15. The installation through portion RFa is provided at a position where the antenna element group 10 of the integrated antenna module 1 is arranged, in the roof member RF. In the example illustrated in FIG. 15, the installation through portion RFa is provided at a position corresponding to the example (integrated antenna module 1H) illustrated in FIG. 14. That is, here, the installation through portion RFa is provided at each of a position where the submodule 60 C is provided (the intersection between the windshield WSF and the roof member RF at the substantially central position in the vehicle width direction of the vehicle V) and a position where the submodule 60D is provided (the substantially central position in the front-rear direction and the vehicle width direction of the roof member RF). The installation through portion RFa penetrates the roof member RF in and out to communicate the indoor side and the outdoor side. The antenna element group 10 is arranged such that the plurality of antenna elements 11 is housed in the installation through portions RFa. With this configuration, the integrated antenna module 1 can appropriately transmit and receive electromagnetic waves without being blocked by the roof member RF via the installation through portion RFa by the antenna element group 10 even when being provided to be adjacent to the indoor side of the roof member RF made of metal. The integrated antenna module 1 is not necessarily provided inside the installation through portion RFa as described above and the installation through portion RFa itself is not necessarily provided when the roof member RF is made of a resin material or when the integrated antenna module 1 is incorporated in the spoiler SP made of resin.

In addition, at least some of the plurality of antenna elements 11 are preferably configured in a thin structure (preferably having a thickness in the thickness direction of 2 cm or smaller) that can be incorporated in a narrow space as described above. With this configuration, at least some of the plurality of antenna elements 11 are configured in the thin structure that can be incorporated inside the vehicle V or in the resin member such as the spoiler SP provided to be exposed to the outside the vehicle V as described above. With this configuration, the plurality of antenna elements 11 can be configured to be easily installed in the narrow space such as the space defined between the interior material and the structural member of the roof member RF and the inside of the resin member provided to be exposed to the outside of the vehicle V, for example.

Incidentally, the resin member in which the antenna element 11 is incorporated is not limited to the spoiler SP, but may be other members provided to be exposed to the outside of the vehicle V, for example, a so-called cowl, a front bumper, a side spoiler, and the like. In addition, the integrated antenna module 1 is not limited to the above arrangement, and all or some of the antenna element group 10, the communication control module 20, and the like may be arranged inside an instrument panel which is a decorative member provided inside the vehicle V, an inner space of the pillar PL, a surface of the windshield WSF or WSR, or the like. In addition, the integrated antenna module 1 is not limited to the above arrangement, and all or some of the antenna element group 10, the communication control module 20, and the like may be arranged inside a cabin, inside a luggage room, inside an engine room, or the like.

Radio Over Fiber (ROF) Connection Between Submodules

Figure 16:
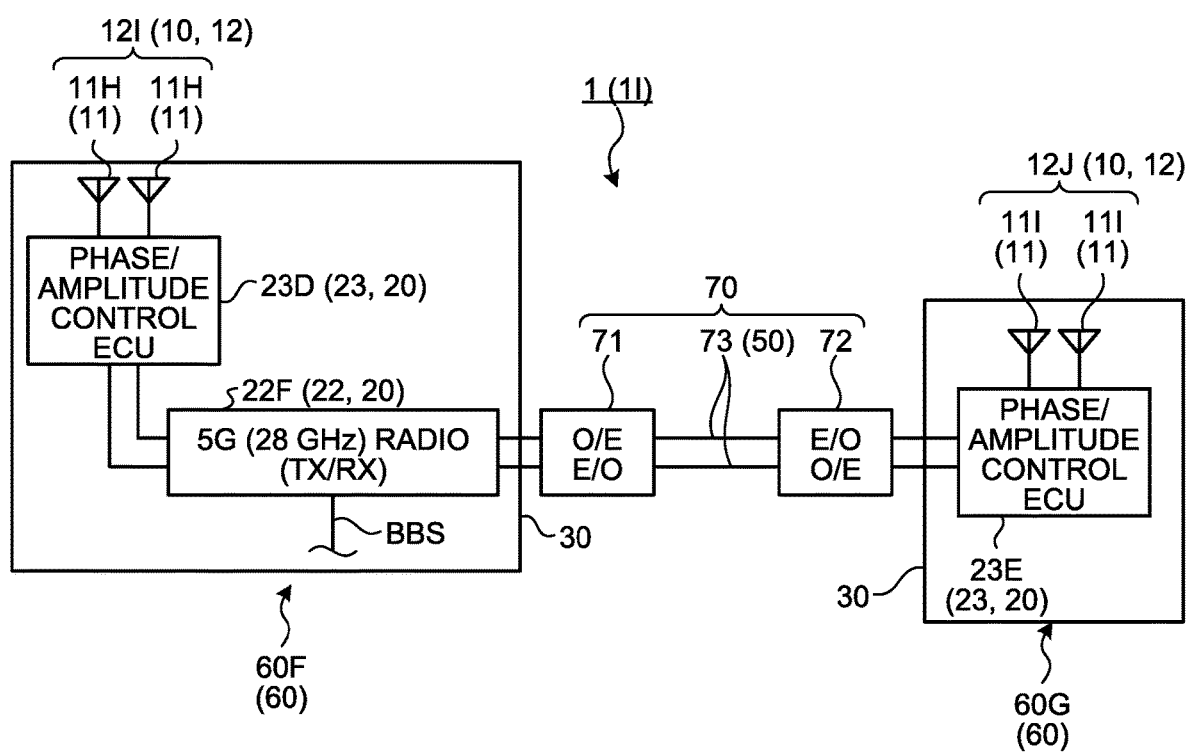
FIG. 16 is a schematic block diagram illustrating a configuration example of an optical signal transmission unit of the integrated antenna module according to the embodiment.

In addition, when being dispersedly arranged to be divided into the plurality of submodules 60 as described in FIGS. 13 and 14, the integrated antenna module 1 may further include an optical signal transmission unit 70 as illustrated in FIG. 16. The optical signal transmission unit 70 is interposed between the plurality of antenna elements 11 and the communication control module 20, and transmits an optical signal (transmits a signal on an amplitude of light). The optical signal transmission unit 70 converts an electrical signal into an optical signal, transmits the converted optical signal, and converts the transmitted optical signal to an electric signal again. Typically, the optical signal transmission unit 70 is interposed between the antenna element 11, which transmits and receives electromagnetic waves of a relatively high frequency band are arranged at a position where a distance to the communication control module 20 configured to process the transmitted and received signal is relatively long, and the communication control module 20. With this configuration, the integrated antenna module 1 can transmits a signal of a high frequency band, which tends to have a relatively large attenuation during transmission, using the optical signal via the optical signal transmission unit 70. As a result, in the integrated antenna module 1 can suppress the attenuation of the signal of the high frequency band appropriately transmit the signal even if the antenna element 11 transmitting and receiving the electromagnetic waves in the relatively high frequency band the communication control module 20 are positioned to be relatively separated from each other.

For example, the integrated antenna module 1 (which will be sometimes referred to as an "integrated antenna module 1I" for the sake of convenience) illustrated in FIG. 16 is arranged dispersedly in a plurality of parts to be divided into two submodules 60F and 60G. The submodules 60F and 60G constitute the integrated antenna module 1I. For example, the submodule 60F is configured to include a plurality of antenna elements 11H constituting the antenna element group 10, a 5G (28 GHz) radio (TX/RX) 22F, a phase/amplitude control ECU 23D, and the housing 30 that houses these units. The antenna elements 11H constitute a 5G (28 GHz) antenna 12I. The 5G (28 GHz) radio (TX/RX) 22F constitutes the transmission/reception circuit 22 for 5G (28 GHz) of the communication control module 20, and receives a so-called baseband signal BBS. The 5G (28 GHz) radio (TX/RX) 22F converts the baseband signal BBS into a radio signal transmitted by wireless communication via the antenna 12. The phase/amplitude control ECU 23D constitutes the phase/amplitude control ECU 23 for 5G (28 GHz) of the communication control module 20. The 5G (28 GHz) radio (TX/RX) 22F and the phase/amplitude control ECU 23D can mutually transmit and receive an RF signal, control signals for control of the respective units, and the like constituting the radio signal. On the other hand, for example, the submodule 60G is configured to include a plurality of antenna elements 11I constituting the antenna element group 10, a phase/amplitude control ECU 23E, and the housing 30 that houses these units. The antenna elements 11I constitute a 5G (28 GHz) antenna 12J. The phase/amplitude control ECU 23E constitutes the phase/amplitude control ECU 23 for 5G (28 GHz) of the communication control module 20. The submodule 60F and the submodule 60G are arranged at positions relatively separated from each other in the vehicle V (positions at which the mutual distance is relatively long). The optical signal transmission unit 70 illustrated in FIG. 16 is interposed between the submodule 60F and the submodule 60G and transmits an optical signal therebetween. The optical signal transmission unit 70 includes a plurality of, here, a pair of, signal converters 71 and 72 and an optical fiber 73. Each of the signal converters 71 and 72 has a function as a so-called E/O converter that converts an electric signal into an optical signal, and a function as an O/E converter that converts an optical signal into an electric signal. The optical fiber 73 constitutes a transmission path to transmit an optical signal and constitutes a part of the above-described cable 50. One of the pair of signal converters 71 and 72, here, the signal converter 71, is connected to the 5G (28 GHz) radio (TX/RX) 22F of the submodule 60F. The other of the pair of signal converters 72, here, the signal converter 72, is connected to the phase/amplitude control ECU 23E of the submodule 60G. The signal converter 71 and the signal converter 72 are connected by the optical fiber 73. The optical signal transmission unit 70 converts an electric signal such as the RF signal and the control signal constituting the radio signal on the submodule 60F side into an optical signal by the signal converter 71. Further, the optical signal transmission unit 70 transmits the optical signal converted by the signal converter 71 to the signal converter 72 via the optical fiber 73. Further, the optical signal transmission unit 70 converts the optical signal transmitted to the signal converter 72 into an electrical signal such as the RF signal and the control signal constituting the radio signal, and transmits the converted electrical signal to the submodule 60G side. Similarly, the optical signal transmission unit 70 converts an electrical signal such as the RF signal and the control signal constituting the radio signal on the submodule 60G side into an optical signal by the signal converter 72. Further, the optical signal transmission unit 70 transmits the optical signal converted by the signal converter 72 to the signal converter 71 via the optical fiber 73. Further, the optical signal transmission unit 70 converts the optical signal transmitted to the signal converter 71 into an electrical signal such as the RF signal and the control signal constituting the radio signal, and transmits the converted electrical signal to the submodule 60F side. Each of the signal converters 71 and 72 may demultiplex the converted electrical signal into a digital signal and an RF signal if necessary and output the digital signal and the RF signal to the respective units. With this configuration, the integrated antenna module 1I can transmit the signal for 5G (28 GHz), which is the signal of the high frequency band, using the optical signal via the optical signal transmission unit 70 between the submodule 60F and the submodule 60G. As a result, the integrated antenna module 1I can suppress the attenuation of the signal for 5G (28 GHz) and properly transmit the signal even if the submodule 60F and the submodule 60G are positioned to be relatively separated from each other.

Figure 17:
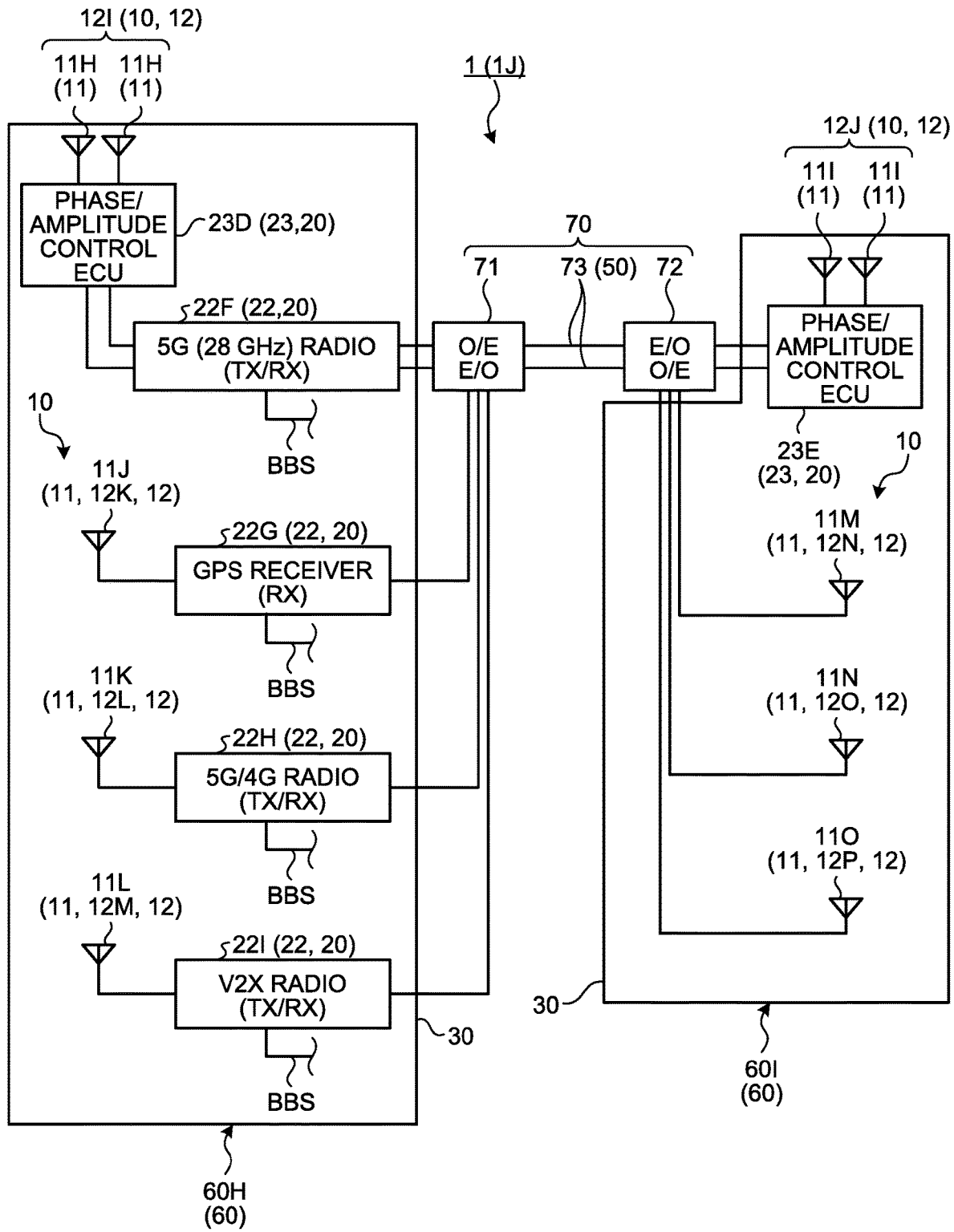
FIG. 17 is a schematic block diagram illustrating a configuration example of the optical signal transmission unit of the integrated antenna module according to the embodiment.

Incidentally, the integrated antenna module 1 may transmit not only the signal of the high frequency band, which tends to have a relatively large attenuation during transmission, but also a signal in a frequency band other than the high frequency band via the optical signal transmission unit 70. For example, the integrated antenna module 1 (which will be sometimes referred to as an "integrated antenna module 1J" for the sake of convenience) illustrated in FIG. 17 is different from the integrated antenna module 1I in terms of including a submodule 60H instead of the submodule 60F and including a submodule 60I instead of the submodule 60G. Other configurations of the integrated antenna module 1J are substantially the same as those of the integrated antenna module 1I. In addition to the above-described configuration of the submodule 60F, the submodule 60H is configured to further include a plurality of antenna elements 11J, 11K, and 11L constituting the antenna element group 10, a GPS receivers (RX) 22G, a 5G (6 GHz or less)/4G radio (TX/RX) 22H, and a V2X radio (TX/RX) 22I. The antenna element 11J constitutes a GPS antenna 12K. The antenna element 11K constitutes a 5G (6 GHz or less)/4G antenna 12L. The antenna element 11L constitutes a V2X antenna 12M. The GPS receiver (RX) 22G constitutes the transmission/reception circuit 22 for GPS of the communication control module 20, and receives a so-called baseband signal BBS. The GPS receiver (RX) 22G converts the baseband signal BBS into a radio signal to be transmitted by wireless communication via the antenna 12. The GPS receiver (RX) 22G can transmit and receive the radio signal to and from the antenna element 11J. The 5G (6 GHz or less)/4G radio (TX/RX) 22H constitutes the transmission/reception circuit 22 for 5G (6 GHz or less)/4G of the communication control module 20 and a so-called baseband signal BBS is input thereto. The 5G (6 GHz or less)/4G radio (TX/RX) 22H converts the baseband signal BBS into a radio signal to be transmitted by wireless communication via the antenna 12. The 5G (6 GHz or less)/4G radio (TX/RX) 22H can transmit and receive the radio signal to and from the antenna element 11K. The V2X radio (TX/RX) 22I constitutes the transmission/reception circuit 22 for V2X of the communication control module 20, and receives a so-called baseband signal BBS. The V2X radio (TX/RX) 22I converts the baseband signal BBS into a radio signal to be transmitted by wireless communication via the antenna 12. The V2X radio (TX/RX) 22I can transmit and receive the radio signal to and from the antenna element 11L. On the other hand, the submodule 60I is configured to further include a plurality of antenna elements 11M, 11N, and 11O constituting the antenna element group 10 in addition to the above-described configuration of the submodule 60G. The antenna element 11M constitutes a GPS antenna 12N. The antenna element 11N constitutes a 5G (6 GHz or less)/4G antenna 12O. The antenna element 11O constitutes a V2X antenna 12P. The optical signal transmission unit 70 illustrated in FIG. 17 is interposed between the submodule 60H and the submodule 60I and transmits an optical signal therebetween. Here, the signal converter 71 is connected to the 5G (28 GHz) radio (TX/RX) 22F of the submodule 60H, and can transmits and receive the RF signal, the control signal, and the like constituting the radio signal to and from the 5G (28 GHz) radio (TX/RX) 22F. Further, the signal converter 71 is also connected to the GPS receiver (RX) 22G, the 5G (6 GHz or less)/4G radio (TX/RX) 22H, and the V2X radio (TX/RX) 22I, and can transmit and receive a radio signal to and from the GPS receiver (RX) 22G, the 5G (6 GHz or less)/4G radio (TX/RX) 22H, and the V2X radio (TX/RX) 22I. On the other hand, the signal converter 72 is connected to the plurality of antenna elements 11M, 11N, and 11O of the submodule 60I without a radio and the like interposed therebetween, and can transmit and receive a radio signal to and from the plurality of antenna elements 11M, 11N, and 11O. With this configuration, the integrated antenna module 1J can transmit a GPS signal, a 5G (6 GHz or less)/4G signal, and a V2X signal in addition to a 5G (28 GHz) signal which is the signal of the high frequency band using the optical signal via the optical signal transmission unit 70 between the submodule 60H and the submodule 60I.

Incidentally, when the integrated antenna module 1 transmits a signal between close positions with a short distance where the influence of attenuation is relatively small, not only the optical signal transmission unit 70 but also a coaxial cable, a low loss cable or the like may be used as the cable 50.

A Plurality of Different Transmission/Reception Modes

As described above, the antenna element group 10 operate in the plurality of different transmission/reception modes as the plurality of antenna elements 11 is selectively used according to a situation. For example, the antenna element group 10 is controlled by the data control ECU 21 of the communication control module 20 such that the plurality of antenna elements 11 operates in the plurality of different transmission/reception modes. Typically, the antenna element group 10 is selectively used in the plurality of different transmission/reception modes according to a situation (for example, a vehicle speed, a current position, an electromagnetic wave state, or the like) of the vehicle V.

1. A Plurality of Frequency Band Transmission/Reception Modes

Figure 18:
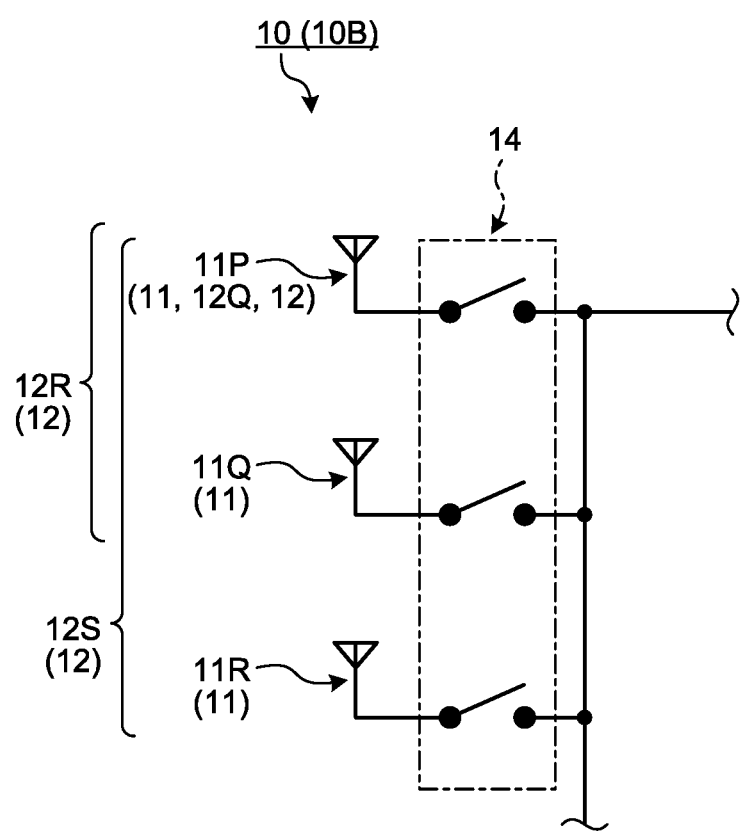
FIG. 18 is a schematic diagram illustrating a plurality of frequency band modes of the antenna element group of the integrated antenna module according to the embodiment.

For example, the antenna element group 10 (which will be sometimes referred to as an "antenna element group 10B" for the sake of convenience) illustrated in FIG. 18 may be configured so as to operate in a plurality of frequency band modes in which frequency bands of electromagnetic waves to be transmitted and received are different from each other as the plurality of different transmission/reception modes. In the antenna element group 10B, a mutual connection state of the plurality of antenna elements 11 is switched according to a situation to switch a combination of the plurality of antenna elements 11, thereby realizing the plurality of frequency band modes. The antenna element group 10B is configured to include a first switching unit 14 that can switch the mutual connection state of the plurality of antenna elements 11. The first switching unit 14 is configured to include, for example, a changeover switch or the like capable of switching a connection state of each of the antenna elements 11 between a conductive and a cut-off state. Here, the conductive state is a state where the target antenna element 11 is connected to be capable of conducting with the other antenna element 11. On the other hand, the cut-off state is a state where the target antenna element 11 is separated from the other antenna element 11. The first switching unit 14 is controlled by the data control ECU 21 of the communication control module 20. Further, the antenna element group 10B can be switched in the plurality of frequency band modes as the mutual connection states among the plurality of antenna elements 11 are switched by the first switching unit 14 based on the control of the data control ECU 21. Here, the antenna element group 10B can be switched to a first frequency band mode, a second frequency band mode, and a third frequency band mode as the plurality of frequency band modes. The first frequency band mode is a transmission/reception mode in which an antenna element 11P is set to the conductive state among the plurality of antenna elements 11, and remaining antenna elements 11Q and 11R among the plurality of antenna elements 11 are set to the cut-off state. In the first frequency band mode, only the antenna element 11P constitutes an antenna 12Q which can transmit and receive an electromagnetic wave of a specific frequency band (for example, a frequency band for 4G) in the antenna element group 10B. The second frequency band mode is a transmission/reception mode in which the antenna element 11P and the antenna element 11Q are set to the conductive state among the plurality of antenna elements 11 and the remaining antenna element 11R among the plurality of antenna elements 11 is set to the cut-off state. In the second frequency band mode, the antenna element 11P and the antenna element 11P are combined to constitute an antenna 12R, which is different from the antenna 12Q and capable of transmitting and receiving an electromagnetic wave of a specific frequency band (for example, a frequency band for 5G), in the antenna element group 10B. The third frequency band mode is a transmission/reception mode in which the antenna element 11P, the antenna element 11Q, and the antenna element 11R are set to the conductive state among the plurality of antenna elements 11, and the remaining antenna elements (not illustrated) among the plurality of antenna elements 11 are set to the cut-off state. In the third frequency band mode, the antenna element 11P, the antenna element 11Q, and the antenna element 11R are combined to constitute an antenna 12S, which is different from the antennas 12Q and 12R and capable of transmitting and receiving an electromagnetic wave of a specific frequency band (for example, another frequency band for 5G), in the antenna element group 10B. The data control ECU 21 controls the first switching unit 14 based on the frequency band of the electromagnetic wave required to be transmitted and received to perform switching among the plurality of frequency band modes. With this configuration, the plurality of antennas 12 capable of transmitting and receiving electromagnetic waves of different frequency bands can be configured with the fewer antenna elements 11 in the antenna element group 10B. As a result, the number of components of the antenna element group 10B can be suppressed, which enables, for example, reduction in size, reduction in weight, and the like.

2. Directivity Variable Mode/Directivity Fixed Mode

Figure 19:
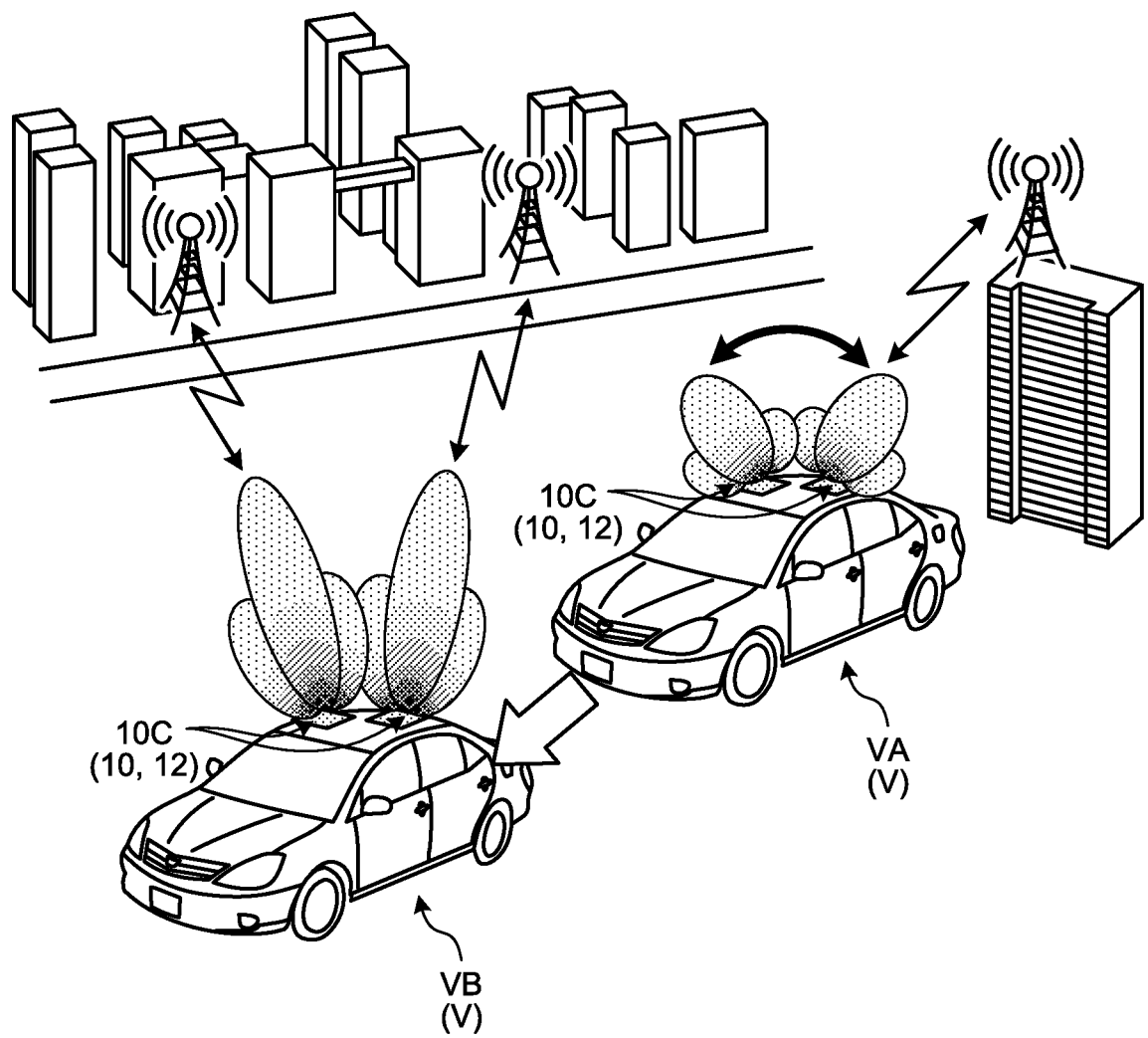
FIG. 19 is a schematic diagram for describing directivity variable mode/directivity fixed mode of the antenna element group of the integrated antenna module according to the embodiment.

In addition, for example, the antenna element group 10 (which will be sometimes referred to as "antenna element group 10C" for the sake of convenience) illustrated in FIG. 19 may be configured so as to operate in a directivity variable mode and a directivity fixed mode as the plurality of different transmission/reception modes. As described above, the antenna element group 10C can control a directivity of the antenna 12 by adjusting a phase and an amplitude of a signal to be transmitted and received based on the control by the data control ECU 21, the phase/amplitude control ECU 23, and the like. As a result, the antenna element group 10C can change a transmission/reception range and a direction of the antenna 12. The antenna element group 10C realizes the directivity variable mode and the directivity fixed mode by controlling the directivity of the antenna 12 according to a situation. The directivity variable mode is a transmission/reception mode in which the directivity of the antenna 12 is variable according to the situation and the transmission/reception range and the direction of the antenna 12 are variable (for example, see a vehicle VA in FIG. 19). On the other hand, the directivity fixed mode is a transmission/reception mode in which the directivity of the antenna 12 is fixed and the transmission/reception range and the direction of the antenna 12 are fixed (for example, see a vehicle VB in FIG. 19). In the directivity variable mode, the antenna element group 10C can ensure a more sensitive transmission/reception state by changing a transmission/reception target of an electromagnetic wave (a communication base station, a communication antenna, or the like) while changing the directivity of the antenna 12 in accordance with traveling of the vehicle VA, for example. On the other hand, for example, the antenna element group 10C can suppress unnecessary power consumption by setting the directivity fixed mode under an environment where an electromagnetic wave state is stable.

Figure 20:
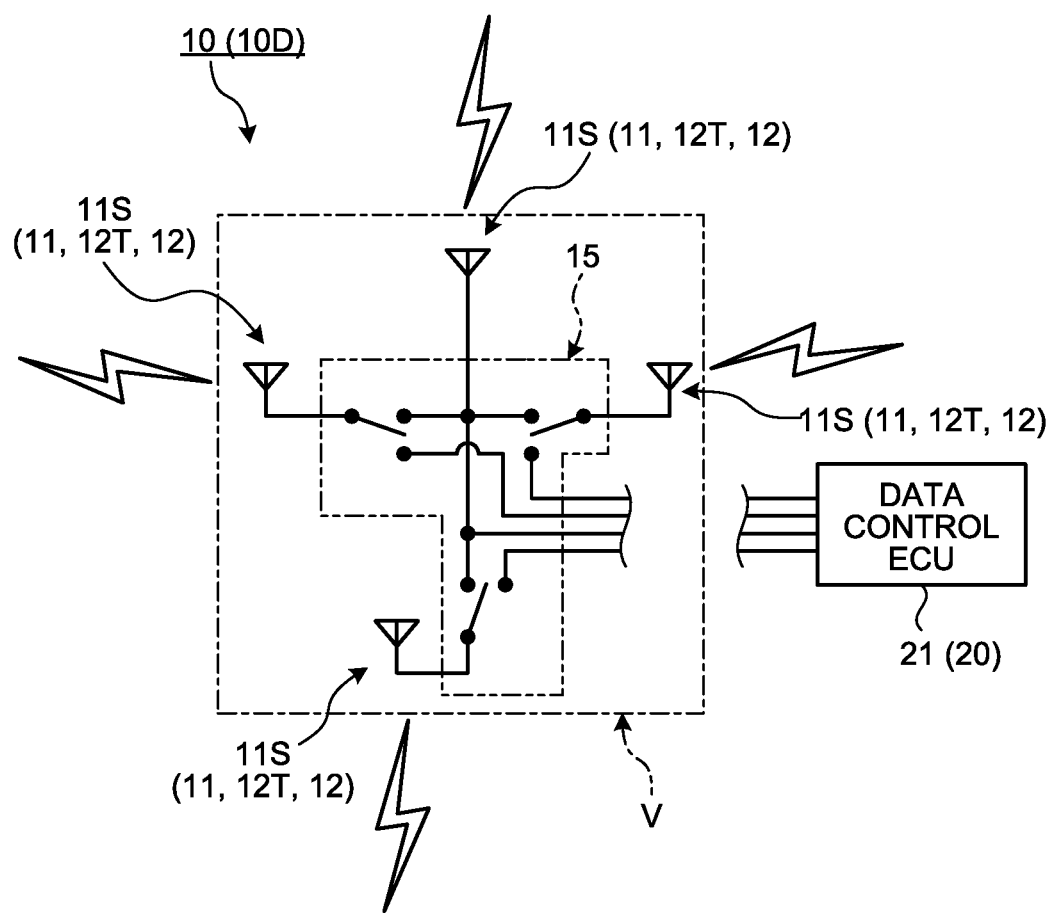
FIG. 20 is a schematic diagram for describing omnidirectional antenna mode/directional antenna mode of the antenna element group of the integrated antenna module according to the embodiment.

3. Omnidirectional Antenna Mode (Diversity Mode)/Directional Antenna Mode (Multiple-Input and Multiple-Output (MIMO) Mode In addition, for example, the antenna element group 10 (which will be sometimes referred to as "antenna element group 10D" for the sake of convenience) illustrated in FIG. 20 may be configured so as to operate in an omnidirectional antenna mode and a directional antenna mode as the plurality of different transmission/reception modes. In the antenna element group 10D, a mutual connection state of the plurality of antenna elements 11 is switched according to a situation to switch a combination of the plurality of antenna elements 11, thereby realizing the omnidirectional antenna mode and the directional antenna mode. The antenna element group 10D is configured to include a second switching unit 15 that can switch the mutual connection state of the plurality of antenna elements 11. The second switching unit 15 is configured to include, for example, a changeover switch or the like capable of switching a connection state of each of the antenna elements 11 between an aggregated state and an independent state. Here, the aggregate state is a connection state where signals of the plurality of antenna elements 11 are aggregated. On the other hand, the independent state is a connection state where signals of the plurality of antenna elements 11 are made independent from each other. The second switching unit 15 is controlled by the data control ECU 21 of the communication control module 20. Further, the antenna element group 10D can be switched in the omnidirectional antenna mode and the directional antenna mode as the mutual connection states among the plurality of antenna elements 11 are switched by the second switching unit 15 based on the control of the data control ECU 21. Here, the antenna element group 10D includes four antenna elements 11S as the plurality of antenna elements 11. Each of the four antenna elements 11S constitutes an antenna 12T. Further, a directivity of each of the four antenna elements 11S is adjusted such that directions of transmission/reception ranges of the antennas 12T, respectively constituted by the antenna elements 11S, are different from each other around the vehicle V. Here, the directivities of the four antenna elements 11S are adjusted such that the directions of the transmission/reception ranges of the antennas 12T, respectively constituted by the antenna elements 11S, are oriented in four directions to be substantially symmetrical around the vehicle V. The omnidirectional antenna mode is a transmission/reception mode in which the four antenna elements 11S are set to the aggregated state. In the omnidirectional antenna mode, the antenna element group 10D aggregates electromagnetic waves received by the respective antennas 12T constituted by the respective antenna elements 11S and outputs the aggregated electromagnetic wave to the data control ECU 21 as one signal to be processed. This omnidirectional antenna mode is typically referred to as a so-called diversity mode in some cases. The diversity mode is typically a transmission/reception mode in which a signal of the antenna 12T having an excellent reception condition is preferentially used or signals are synthesized to remove noise for signals based on the same electromagnetic wave from the same transmission/reception target received by the plurality of antennas 12T. In the diversity mode, communication quality and reliability can be improved. On the other hand, the directional antenna mode is a transmission/reception mode in which the four antenna elements 11S are set to the independent state. In the directional antenna mode, the antenna element group 10D outputs electromagnetic waves received by the respective antennas 12T comprised by the respective antenna elements 11S independently to the data control ECU 21 one signal by one signal, that is, four signals in total to be processed. This directional antenna mode is typically referred to as a so-called MIMO mode in some cases. The MIMO mode is typically a transmission/reception mode in which the communication quality is improved by causing the respective signals based on a plurality of electromagnetic waves from a plurality of transmission/reception targets received by the plurality of antennas 12T to be processed as independent signals. The data control ECU 21 switches the omnidirectional antenna mode and the directional antenna mode by controlling the second switching unit 15 according to the situation. For example, the data control ECU 21 switches the transmission/reception mode of the antenna element group 10D between the omnidirectional antenna mode and the directional antenna mode according to a current position of the vehicle V or the like based on a GPS signal or the like. For example, the data control ECU 21 sets the antenna element group 10D to the omnidirectional antenna mode when the vehicle V travels in a suburb. Typically, the suburb tends to have relatively fewer transmission/reception targets such as a communication base station and a communication antenna than an urban area. Therefore, when the vehicle V travels in the suburb, the antenna element group 10D is set to the omnidirectional antenna mode so that proper communication quality can be ensured in a situation where there are few transmission/reception targets. On the other hand, the data control ECU 21 sets the antenna element group 10D in the directional antenna mode when the vehicle V travels in the urban area. Typically, the urban area tends to have a relatively large number of transmission/reception targets such as a communication base station and a communication antenna as compared with the suburb. Therefore, when the vehicle V travels in the urban area, the antenna element group 10D is set to the directional antenna mode so that proper communication quality can be ensured in a situation where there are many transmission/reception targets. With this configuration, the antenna element group 10D can switch the transmission/reception mode of the antenna element group 10D between the omnidirectional antenna mode and the directional antenna mode according to the situation of the vehicle V, thereby causing the respective antennas 12T to function as a high-performance antenna with high sensitivity according to the situation. Incidentally, the antenna element group 10D does not necessarily include the second switching unit 15, and the omnidirectional antenna mode and the directional antenna mode may be switched by internal processing of the data control ECU 21. In this case, for example, the data control ECU 21 realizes the omnidirectional antenna mode by processing an aggregated and synthesized signal after being received by the respective antennas 12T directly as one signal. On the other hand, for example, the data control ECU 21 realizes the directional antenna mode by performing a process of separating the aggregated and synthesized signal after being received by the respective antennas 12T into four signals and processing the separated four signals. Even in this case, the antenna element group 10D can be configured so as to operate in the omnidirectional antenna mode and the directional antenna mode as the plurality of different transmission/reception modes as described above.

4. Normal Transmission/Reception Mode/Interference Suppression Mode

In addition, for example, the antenna element group 10 may be configured so as to operate in a normal transmission/reception mode and an interference suppression mode as the plurality of different transmission/reception modes. The normal transmission/reception mode is a transmission/reception mode in which the plurality of antennas 12 constituted by the plurality of antenna elements 11 of the antenna element group 10 operate without being particularly restricted in operation. On the other hand, the interference suppression mode is a transmission/reception mode in which a normal operation of the specific antenna 12 for which transmission and reception is required is permitted among the plurality of antennas 12 constituted by the plurality of antenna elements 11 of the antenna element group 10 but an operation (transmission and reception of electromagnetic waves) of the other antenna 12 is restricted. With this configuration, the antenna element group 10 can suppress interference of electromagnetic waves to be transmitted and received by the other antenna 12 with respect to electromagnetic waves to be transmitted and received by the specific antenna 12. As a result, the antenna element group 10 can ensure a transmission/reception state of the specific antenna 12 for which transmission and reception is required as a more sensitive state that is not influenced by the other antenna 12.

Auxiliary Antenna Element

The antenna element group 10 configured as described above may be configured to include a plurality of main antenna elements 16 and auxiliary antenna elements 17 as the plurality of antenna elements 11 (for example, see FIG. 11). In the integrated antenna module 1E illustrated in FIG. 11, the plurality of main antenna elements 16 is constituted by, for example, the one satellite communication antenna 12D, the two 5G (28 GHz) antennas 12E, one of the two 5G (6 GHz or less)/4G antennas 12F, the one GPS antenna 12G, and the plurality of antenna elements 11 (antenna elements 11C, 11D, 11E, 11F, and 11G) constituting the one V2X antenna 12H. Meanwhile, in the integrated antenna module 1E, for example, the plurality of antenna elements 11 (antenna elements 11E) constituting the other of the two 5G (6 GHz or less)/4G antennas 12F constitute the plurality of auxiliary antenna elements 17. The main antenna elements 16 are the antenna elements 11 forming a main group (lump) in the antenna element group 10. On the other hand, the auxiliary antenna elements 17 are the auxiliary antenna elements 11 provided at positions different from the plurality of main antenna elements 16. Typically, the number of the auxiliary antenna elements 17 is smaller than the number of the plurality of main antenna elements 16. Typically, the auxiliary antenna elements 17 are preferably provided in a part separated from the main antenna element 16, a part close to the communication control module 20, and a strongly protected part that is hardly damaged at the time of an accident of the vehicle V or the like. With this configuration, so-called redundancy can be ensured for the integrated antenna module 1E. That is, even if certain failure occurs in the plurality of main antenna elements 16, the minimum required quantities of electromagnetic waves can be transmitted and received by the auxiliary antenna elements 17 in the integrated antenna module 1E, and as a result, it is possible to maintain the minimum function of the module, for example. As a result, the integrated antenna module 1E can resolve a conflict of aggregation of the plurality of antenna elements 11 as the main antenna element 16, for example.

Incidentally, here, the auxiliary antenna element 17 functions as the 5G (6 GHz or less)/4G antenna 12F even in a normal condition where the plurality of main antenna elements 16 normally operates, but the invention is not limited thereto. It is not limited to this. The auxiliary antenna element 17 may be configured so as not to operate as the antenna 12 in the normal condition and to function as the antenna 12 when failure occurs in the plurality of main antenna elements 16. In this case, the integrated antenna module 1E may be configured to, for example, include various switching mechanisms configured to switch an operating state of the auxiliary antenna element 17. In addition, the integrated antenna module 1E may be configured to include, for example, an auxiliary cable constituting a redundant system separately from the main cable 50 (refer to FIG. 7 and the like) connecting the respective units, and the like as the redundant system different from the auxiliary antenna element 17. For example, the auxiliary cable is preferably installed together with the cable 50 and routed along a different route from the cable 50.

Figure 21:
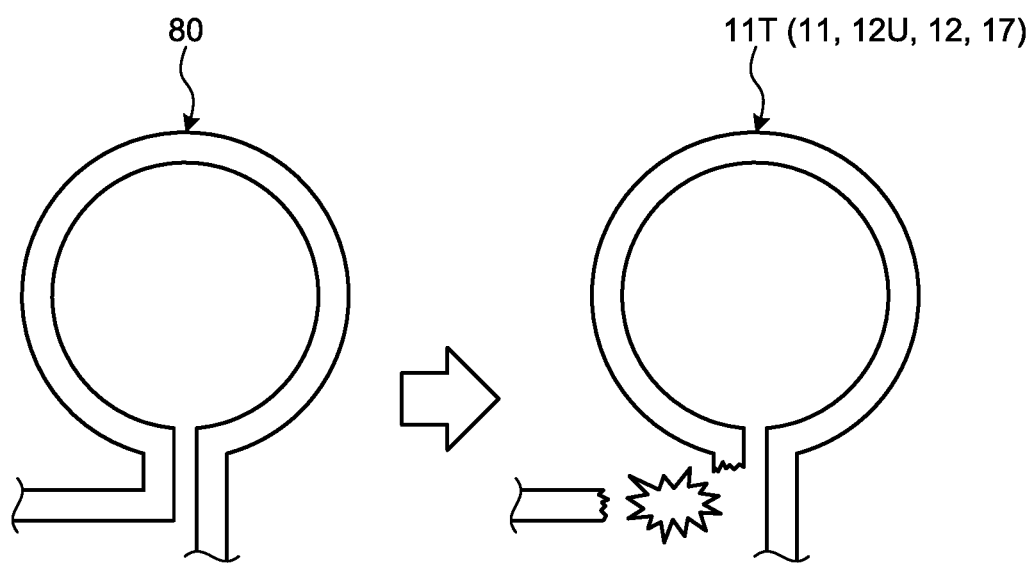
FIG. 21 is a schematic diagram for describing an example of an auxiliary antenna of the integrated antenna module according to the embodiment.

In addition, the integrated antenna module 1 may include the auxiliary antenna element 17 configured as the communication transmission path 80 is open at a predetermined part, for example, as illustrated in FIG. 21. Typically, the communication transmission path 80 functions as a transmission path that transmits a signal between devices mounted on the vehicle V in a normal condition where the plurality of main antenna elements 16 normally operates. The communication transmission path 80 is configured to include a part having a shape corresponding to a shape of the antenna element 11T. Further, the communication transmission path 80 constitutes the antenna element 11T by being open at the predetermined part, for example, when failure occurs in the plurality of main antenna elements 16. The antenna element 11T constitutes the auxiliary antenna element 17, and here, constitutes an antenna 12U. In this case, the integrated antenna module 1 may include, for example, a cutting operation unit that manually sets the part to be open as a configuration for setting the communication transmission path 80 to be open at the predetermined part when failure occurs in the plurality of main antenna elements 16. In addition, the integrated antenna module 1 may include, for example, a cutting operating unit that operates under the control of the data control ECU 21 to set the part to be open as the configuration for setting the communication transmission path 80 to be open at the predetermined part when failure occurs in the plurality of main antenna elements 16. In addition, the integrated antenna module 1 may be provided with the communication transmission path 80 at a position where the part is likely to be disconnected and easily open at the time of an accident of the vehicle V or the like such that the auxiliary antenna element 17 may be formed at the time of the accident or the like when there is a risk that the failure may occur in the plurality of main antenna elements 16.

In the integrated antenna module 1 and the in-vehicle system OS described above, the plurality of antenna elements 11 forming the antenna element group 10 can be combined to constitute the plurality of antennas 12 capable of transmitting and receiving the plurality of electromagnetic waves. As a result, the integrated antenna module 1 and the in-vehicle system OS can ensure the proper communication using the diverse electromagnetic waves by the plurality of antenna elements 11 aggregated and integrated as the antenna element group 10.

More specifically, the integrated antenna module 1 and the in-vehicle system OS described above can ensure the proper communication using the electromagnetic waves of diverse frequencies by the plurality of antenna elements 11 aggregated and integrated as the antenna element group 10.

Further, the integrated antenna module 1 and the in-vehicle system OS described above may be configured such that at least some of the plurality of antenna elements 11 are provided in the planar shape on the plate-like member formed in the plate shape, here, the sheet-like resin film 41. With this configuration, the integrated antenna module 1 and the in-vehicle system OS can improve the mountability of the antenna element group 10 to the vehicle V. In addition, the integrated antenna module 1 and the in-vehicle system OS can suppress, for example, the influence on the appearance and the like of the vehicle V with this configuration.

More specifically, at least some of the plurality of antenna elements 11 may be configured in the thin structure that can be incorporated inside the vehicle V or in the resin member such as the spoiler SP outside the vehicle V in the integrated antenna module 1 and the in-vehicle system OS described above. With this configuration, the integrated antenna module 1 and the in-vehicle system OS can improve the mountability of the antenna element group 10 to a narrow space.

Further, the integrated antenna module 1 and the in-vehicle system OS described above may be configured such that at least some of the plurality of antenna elements 11 and at least a part of the communication control module 20 are assembled to the housing 30 to form a unit. With this configuration, the integrated antenna module 1 and the in-vehicle system OS can improve installation workability to the vehicle V.

Further, the integrated antenna module 1 and the in-vehicle system OS described above may be configured such that the optical signal transmission unit 70 is interposed between the plurality of antenna elements 11 and the communication control module 20. With this configuration, the integrated antenna module 1 and the in-vehicle system OS can suppress the attenuation of the signal of the high frequency band by the optical signal transmission unit 70 and properly transmit the signal even if the antenna element 11 and the communication control module 20 are positioned to be relatively separated from each other.

Further, the integrated antenna module 1 and the in-vehicle system OS described above may be configured to include the main antenna element 16 and the auxiliary antenna element 17 as the plurality of antenna elements 11. With this configuration, the integrated antenna module 1 and the in-vehicle system OS can ensure the redundancy.

Further, the integrated antenna module 1 and the in-vehicle system OS described above may be configured so as to operate in the plurality of different transmission/reception modes as the plurality of antenna elements 11 is selectively used according to the situation. With this configuration, the antenna 12 constituted by the plurality of antenna elements 11 can be configured as a high-function antenna according to the situation in the integrated antenna module 1 and the in-vehicle system OS.

Incidentally, the integrated antenna module and the in-vehicle system according to the embodiment of the present invention described above are not limited to the above-described embodiment, and various modifications can be made within the scope described in the claims. The integrated antenna module and the in-vehicle system according to the present embodiment may be configured by appropriately combining constituent elements of the above-described embodiment and modifications.

The integrated antenna module 1 and the in-vehicle system OS described above may be configured by combining other electromagnetic wave transmission/reception techniques. For example, the integrated antenna module 1 and the in-vehicle system OS may have a configuration for transmission and reception of electromagnetic waves via a parabolic antenna shape (a shape corresponding to a reflector having a parabolic curved surface) attached to an exterior material of the vehicle V.

The integrated antenna module and the in-vehicle system according to the present embodiments has the above configurations, thereby achieving the effect that it is possible to ensure proper communication using diverse electromagnetic waves.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An integrated antenna module comprising:
an antenna element group that is mounted on a vehicle and is formed of a plurality of antenna elements, wherein
the antenna element group constitutes a plurality of antennas capable of transmitting or receiving a plurality of electromagnetic waves by combining the plurality of antenna elements,
the antenna element group is configured to include a switching unit,
the switching unit is configured to operate the antenna element group in a plurality of different transmission/reception modes by switching a mutual connection state of the plurality of antenna elements,
the antenna element group is configured to operate in an omnidirectional antenna mode in which the plurality of antenna elements are set to an aggregated state and aggregates electromagnetic waves received by each antenna constituted by each antenna element in to one signal and a directional antenna mode in which the plurality of antenna elements are set to an independent state and independent electromagnetic waves received by each antenna constituted by each antenna element to one signal by one signal, as the plurality of different transmission/reception modes, and
in the omnidirectional antenna mode, a signal of the antenna having an excellent reception condition is preferentially used or signals are synthesized to remove noise for signals based on same electromagnetic waves from a same transmission/reception target received by the plurality of antennas.

2. The integrated antenna module according to claim 1, wherein
the antenna element group constitutes the plurality of antennas capable of transmitting or receiving a plurality of electromagnetic waves of different frequencies by combining the plurality of antenna elements.

3. The integrated antenna module according to claim 1, wherein
at least some of the plurality of antenna elements are provided in a planar shape on a plate-like member formed in a plate shape.

4. The integrated antenna module according to claim 2, wherein
at least some of the plurality of antenna elements are provided in a planar shape on a plate-like member formed in a plate shape.

5. The integrated antenna module according to claim 1, wherein
at least some of the plurality of antenna elements are configured in a thin structure that is able to be incorporated inside the vehicle or in a resin member provided to be exposed to an outside of the vehicle.

6. The integrated antenna module according to claim 2, wherein
at least some of the plurality of antenna elements are configured in a thin structure that is able to be incorporated inside the vehicle or in a resin member provided to be exposed to an outside of the vehicle.

7. The integrated antenna module according to claim 3, wherein
at least some of the plurality of antenna elements are configured in a thin structure that is able to be incorporated inside the vehicle or in a resin member provided to be exposed to an outside of the vehicle.

8. The integrated antenna module according to claim 1, further comprising:
a communication control module that controls an operation of the antenna element group; and
a housing to which at least some of the plurality of antenna elements and at least a part of the communication control module are assembled.

9. The integrated antenna module according to claim 2, further comprising:
a communication control module that controls an operation of the antenna element group; and
a housing to which at least some of the plurality of antenna elements and at least a part of the communication control module are assembled.

10. The integrated antenna module according to claim 3, further comprising:
a communication control module that controls an operation of the antenna element group; and
a housing to which at least some of the plurality of antenna elements and at least a part of the communication control module are assembled.

11. The integrated antenna module according to claim 5, further comprising:
a communication control module that controls an operation of the antenna element group; and
a housing to which at least some of the plurality of antenna elements and at least a part of the communication control module are assembled.

12. The integrated antenna module according claim 1, wherein
the antenna element group includes, as the plurality of antenna elements, a plurality of main antenna elements and an auxiliary antenna element provided at a different position from the plurality of main antenna elements.

13. The integrated antenna module according to claim 2, wherein the antenna element group includes, as the plurality of antenna elements, a plurality of main antenna elements and an auxiliary antenna element provided at a different position from the plurality of main antenna elements.

14. The integrated antenna module according to claim 3, wherein
the antenna element group includes, as the plurality of antenna elements, a plurality of main antenna elements and an auxiliary antenna element provided at a different position from the plurality of main antenna elements.

15. The integrated antenna module according claim 5, wherein
the antenna element group includes, as the plurality of antenna elements, a plurality of main antenna elements and an auxiliary antenna element provided at a different position from the plurality of main antenna elements.

16. The integrated antenna module according claim 8, wherein
the antenna element group includes, as the plurality of antenna elements, a plurality of main antenna elements and an auxiliary antenna element provided at a different position from the plurality of main antenna elements.

17. The integrated antenna module according to claim 1, wherein
the antenna element group operates in a plurality of different transmission/reception modes as the plurality of antenna elements is selectively used according to a situation.

18. An in-vehicle system comprising:
an integrated antenna module as claimed in claim 1, that is mounted on a vehicle and capable of transmitting or receiving electromagnetic waves; and
a router that is electrically connected to the integrated antenna module and relays communication between the integrated antenna module and an in-vehicle device mounted on the vehicle.

19. An integrated antenna module comprising:
an antenna element group that is mounted on a vehicle and is formed of a plurality of antenna elements;
a communication control module that controls an operation of the antenna element group;
a housing to which at least some of the plurality of antenna elements and at least a part of the communication control module are assembled; and
an optical signal transmission unit that is interposed between the plurality of antenna elements and the communication control module, converts an electric signal into an optical signal and transmits the converted optical signal, and converts the transmitted optical signal into an electric signal, wherein
the antenna element group constitutes a plurality of antennas capable of transmitting or receiving a plurality of electromagnetic waves by combining the plurality of antenna elements.

20. The integrated antenna module according claim 19, wherein
the antenna element group includes, as the plurality of antenna elements, a plurality of main antenna elements and an auxiliary antenna element provided at a different position from the plurality of main antenna elements.

* * * * *